(12) United States Patent
Takenaka

(10) Patent No.: US 6,353,773 B1
(45) Date of Patent: *Mar. 5, 2002

(54) REMOTE CONTROL SYSTEM FOR BIPED LOCOMOTION ROBOT

(75) Inventor: Toru Takenaka, Wako (JP)

(73) Assignee: Honda Giken Kogyo Kabushiki Kaissha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/063,572

(22) Filed: Apr. 21, 1998

(30) Foreign Application Priority Data

Apr. 21, 1997 (JP) .............................................. 9-103604
Jun. 20, 1997 (JP) .............................................. 9-164542

(51) Int. Cl.[7] .............................................. G06F 19/00
(52) U.S. Cl. .......................... 700/245; 700/79; 700/900; 700/95; 700/96; 312/223; 340/825.06; 361/683; 361/686; 361/724; 318/568.01; 318/568.21; 414/728; 414/744; 414/936; 414/937
(58) Field of Search .......................... 700/245, 79, 900; 700/95, 96; 312/223.6; 340/825.06; 361/683, 686, 724; 318/568.01, 568.21; 414/728, 744.3, 936, 937

(56) References Cited

U.S. PATENT DOCUMENTS

| | | | | | |
|---|---|---|---|---|---|
| 4,095,367 | A | * | 6/1978 | Ogawa | 446/73 |
| 5,052,680 | A | * | 10/1991 | Malewicki et al. | 472/137 |
| 5,157,316 | A | * | 10/1992 | Glovier | 318/568.11 |
| 5,158,493 | A | * | 10/1992 | Morgrey | 446/355 |
| 5,318,471 | A | * | 6/1994 | Glovier | 446/268 |
| 5,337,235 | A | * | 8/1994 | Takahashi et al. | 701/23 |
| 5,416,393 | A | * | 5/1995 | Gomi et al. | 318/568.2 |
| 5,423,708 | A | * | 6/1995 | Allen | 446/356 |
| 5,426,586 | A | * | 6/1995 | Ozawa | 14/730 |
| 5,745,055 | A | * | 4/1998 | Redlich et al. | 341/20 |
| 5,841,258 | A | * | 11/1998 | Takenaka | 318/568.12 |
| 5,872,438 | A | * | 2/1999 | Roston | 318/568.11 |

FOREIGN PATENT DOCUMENTS

JP         5-337849         12/1993

OTHER PUBLICATIONS

Fukuda, T.; Komata, Y.; Arakawa, T. Robotics and Automation, 1997. Proceedings., 1997 IEEE International Conference on Robotics and Automation, vol.: 1, 1997 pp.: 217–222 vol. 1.*
Minakata, H.; Hori, Y. Industrial Electronics, Control and Instrumentation, 1994. IECON '94., 20th International Conference on Control and Instrumentation, vol.: 2, 1994 pp.: 1009–1014 vol. 2.*
Adachi et al, (Intelligent Robots and Systems, 1997. IROS '97., Proceedings of the 1997 IEEE/RSJ International Conference on , vol.: 1, 1997 pp.: 260–265 vol. 1.*
English language Abstract of JP 5–318340.
English language Abstract of JP 10–180657.
Abstract of JP 5–337849 in English.

* cited by examiner

*Primary Examiner*—Ayaz Sheikh
*Assistant Examiner*—Firmin Backer
(74) *Attorney, Agent, or Firm*—Lyon & Lyon LLP

(57) ABSTRACT

A remote control system for remotely controlling a biped locomotion robot as manipulated by an operator has an upper body support mechanism for supporting an upper body of the operator while allowing the operator to move feet thereof. Operation states of the feet of the operator whose upper body is supported by the upper body support mechanism are detected, and leg operation commands are applied to the biped locomotion robot depending on the detected operation states of the feet of the operator. The operation states of the feet of the operator include at least an operation state of each of the feet of the operator which corresponds to lifting of each leg of the biped locomotion robot from a floor, and an operation state of each of the feet of the operator which corresponds to landing of each leg of the biped locomotion robot on a floor.

28 Claims, 17 Drawing Sheets

LEFT FOOT LANDING REFERENCE POSITION

RIGHT FOOT LANDING REFERENCE POSITION

REMOTE CONTROL SYSTEM FOR BIPED LOCOMOTION ROBOT

BACKGROUND OF THE INVENTION

1. Field of the Invention

The present invention relates to a remote control system for remotely controlling a biped (two-legged) locomotion robot.

2. Description of the Prior Art

There has heretofore been known in the art a remote control system for remotely controlling a robot to operate with a robot manipulator such as a joystick.

For controlling a biped locomotion robot to walk forward, the operator operates the robot manipulator in a direction corresponding to the forward side of the robot. The stride, walking stride, etc. of the robot are commanded by the amount of movement of the robot manipulator as it is operated by the operator.

With the known remote control system, since the movement of each of the legs as the biped locomotion robot walks, i.e., as the legs are alternately landed on the floor and lifted off the floor, is of a pattern which is entirely different from the pattern of movement of the robot manipulator, the operator cannot easily obtain a feel of the actual movement of the robot legs. For example, when the operator commands the stride or walking speed of the biped locomotion robot with the amount of movement of the robot manipulator, the stride or walking speed which is actually while perceptively recognizing the movement of the legs of the robot, and also to move the robot in a wide range under various different environmental conditions.

To achieve the above object, there is provided in accordance with the present invention a remote control system for remotely controlling a biped locomotion robot as manipulated by an operator, comprising an upper body support mechanism for supporting an upper body of the operator while allowing the operator to move feet thereof, foot operation state detecting means for detecting operation states of the feet of the operator whose upper body is supported by the upper body support mechanism, and leg operation commanding means for applying leg operation commands to the biped locomotion robot depending on the operation states of the feet of the operator as detected by the foot operation state detecting means.

For operating the legs of the biped locomotion robot, the operator supports its own upper body on the upper body support mechanism, and moves the feet in a pattern, e.g., a walking pattern, in which the operator wants to move the legs of the biped locomotion robot. At this time, the foot operation state detecting means detects an operation state of each of the feet of the operator, e.g., the operation of each foot corresponding to the lifting of each leg of the biped locomotion robot from a floor, the operation of each foot corresponding to the landing of each leg of the biped locomotion robot on a floor, the position or orienta-achieved may be greater or smaller than the operator has expected, but the operator cannot perceptively recognize such an error from the amount of movement of the robot manipulator.

Therefore, the operator is required to be highly skilled to operate the robot manipulator in order to control the robot to operate exactly as intended by the operator.

Another tpye of remote control system has a master unit which is worn by the operator. For controlling the biped locomotion robot to walk with the master unit, the operator actually walks, and the master unit delivers a command representing the walking movement of the operator to the biped locomotion robot.

The remote control system requires that the master unit be equipped with a facility which provides the same environment as the environment in which the robot operates, i.e., a floor on which the robot moves and other structures surrounding the robot. Because of limitations imposed by such a facility, the remote control system fails to move the robot in a wide range under various different environmental conditions.

SUMMARY OF THE INVENTION

It is therefore an object of the present invention to provide a remote control system for remotely controlling a biped locomotion robot with a robot manipulator operated by the operator, the remote control system allowing the operator to move legs of the robot reliably as desired locomotion of each foot from time to time, or a rate of change thereof. Depending on the detected operation states of the feet of the operator, the leg operation commanding means applies leg operation commands to the biped locomotion robot. The legs of the biped locomotion robot are operated on the basis of the applied leg operation commands.

Therefore, the operator can manipulate the legs of the biped locomotion robot with the movement of its own feet, and can recognize the operation of the legs of the biped locomotion robot with the movement of its own feet. Since the operator is able to operate the legs of the robot by moving its own feet while the upper body is being supported by the upper body support mechanism, the operator is not required to move in order to operate the robot. Thus, the operator can move the robot at will under given environment conditions for the robot simply by moving the feet in view of the environment conditions for the robot.

With the remote control system, the operator can perceptively recognize the movement of the legs of the robot based on the movement of its own feet, and hence can move the legs of the robot reliably as desired. The operator can also move the robot in a wide range under various environmental conditions.

The operation states of the feet of the operator include at least an operation state of each of the feet of the operator which corresponds to lifting of each leg of the biped locomotion robot from a floor, and an operation state of each of the feet of the operator which corresponds to landing of each leg of the biped locomotion robot on a floor.

Since the biped locomotion robot moves or walks by repeatedly lifting and landing its legs like human beings, the operation states of the feet of the operator which correspond to the lifting and the landing of the legs of the robot are detected, and leg operation commands based on the detected operation states are given to the robot for thereby walking the robot accurately according to the pattern of movement of the feet of the operator.

Preferably, the foot operation state detecting means comprises operator foot position/orientation detecting means for detecting a relative positional and/or orientational relationship between the feet of the operator in at least the operation state of each of the feet of the operator which corresponds to landing of each leg of the biped locomotion robot on the floor, and the leg operation commanding means comprises means for applying a command representing a landed position and/or orientation of the leg to be landed of the biped locomotion robot to the biped locomotion robot depending on the relative positional and/or orientational relationship between the feet of the operator as detected by the foot operation state detecting means.

The landed position and/or orientation of each leg to be landed of the biped locomotion robot is determined by the relative positional and/or orientational relationship between the feet of the operator in the operation state of each of the feet of the operator which corresponds to landing of each leg of the biped locomotion robot on the floor. Therefore, when the operator moves the foot corresponding to one of the legs to be landed of the robot while walking the robot, the operator adjusts as desired the relative positional and/or orientational relationship of the foot to the other foot, so that the operator is able to control the stride of the robot and the direction of walking of the robot in the same manner as the operator walks. The operator can operate the legs of the robot as desired with a feel of unison between the movement of the feet and the movement of the legs of the robot.

The remote control system further comprises a foot support mechanism for supporting the feet of the operator whose upper body is supported by the upper body support mechanism, the foot support mechanism being movable with the feet of the operator, actuator means for actuating the foot support mechanism, robot foot position/orientation detecting means for detecting a position and/or orientation of a foot of a leg of the biped locomotion robot with respect to an upper body of the biped locomotion robot when the leg of the biped locomotion robot is landed on the floor, and foot support mechanism control means for controlling the actuator means to equalize the position and/or orientation of the foot of the operator which corresponds to the landed leg of the biped locomotion robot with respect to the upper body of the operator, to a position and/or orientation which corresponds to the position and/or orientation, detected by the robot foot position/orientation detecting means, of the foot of the landed leg of the biped locomotion robot with respect to the upper body of the biped locomotion robot.

If the robot walks forward, for example, the leg that is landed (the supporting leg) moves backward with respect to the upper body of the robot. If the robot walks up steps, for example, the leg that is landed moves backward and downward with respect to the upper body of the robot. The foot support mechanism control means controls the actuator means to equalize the position and/or orientation of the foot of the operator which corresponds to the landed leg of the biped locomotion robot with respect to the upper body of the operator, to a position and/or orientation which corresponds to the position and/or orientation, detected by the robot foot position/orientation detecting means, of the foot of the landed leg of the biped locomotion robot with respect to the upper body of the biped locomotion robot. Thus, the foot of the operator corresponding to the landed leg of the robot moves with respect to the upper body of the operator in the same pattern as when the robot walks or walks up or down steps. Consequently, the operator can operate the legs of the robot as desired with a greater feel of unison between the movement of the feet and the movement of the legs of the robot.

Preferably, the foot support mechanism has foot acting force detecting means for detecting an acting force applied from each of the feet of the operator, and the foot support mechanism control means comprises means for controlling the actuator means to cause the foot support mechanism to follow movement of each of the feet of the operator based on the acting force detected by the foot acting force detecting means.

Even in the absence of any means for controlling the position and/or orientation of the foot of the operator corresponding to the landed leg of the robot with respect to the upper body of the operator, the remote control system preferably further comprises a foot support mechanism for supporting the feet of the operator whose upper body is supported by the upper body support mechanism, the foot support mechanism being movable with the feet of the operator, foot acting force detecting means for detecting an acting force applied from each of the feet of the operator, actuator means for actuating the foot support mechanism, and foot support mechanism control means for controlling the actuator means to cause the foot support mechanism to follow movement of each of the feet of the operator based on the acting force detected by the foot acting force detecting means.

Because an acting force applied from each foot of the operator to the foot support mechanism is detected, and the actuator means for actuating the foot support mechanism is controlled to cause the foot support mechanism to follow movement of each of the feet of the operator based on the detected acting force, the operator can move its own feet supported by the foot support mechanism freely without any substantial efforts, and hence can smoothly operate to move the legs of the robot as desired.

In order to cause the foot support mechanism to follow movement of each of the feet of the operator, the foot support mechanism control means comprises means for controlling the actuator means to move the foot support mechanism into a position and/or orientation to reduce a change in the acting force detected by the foot acting force detecting means.

The remote control system which basically comprises the upper body support mechanism, the foot operation state detecting means, and the leg operation commanding means is capable of detecting the operation states of the feet of the operator based on speeds or accelerations of the feet or acting forces applied from the feet to the foot support mechanism. However, the remote control system may be arranged as follows:

The remote control system may further comprise a rotatable ball for placing releasably thereon the feet of the operator whose upper body is supported by the upper body support mechanism, foot landing/lifting detecting means for detecting whether each of the feet of the operator is landed on or lifted off the ball, and ball rotation detecting means for detecting an angular displacement and/or a rotational direction of the ball when the ball is rotated by one of the feet of the operator after the other foot of the operator is lifted off the ball until the other foot is landed again on the ball, the foot operation state detecting means comprising means for producing detected data from the foot landing/lifting detecting means and detected data from the ball rotation detecting means as data indicative of the operation states of the feet of the operator.

The operator whose upper body is supported by the upper body support mechanism moves its feet alternately up and down with respect to the ball and rotates the ball with the foot held in contact with the ball, for thereby moving the feet in substantially the same pattern as when the operator is actually walking. The detected data (indicative of whether the feet are landed on or lifted off the ball) from the foot landing/lifting detecting means and the detected data (indicative of an angular displacement and/or rotational direction of the ball) from the ball rotation detecting means are representative of the operation states of the feet of the operator. The detected data from the foot landing/lifting detecting means and the detected data from the ball rotation detecting means are obtained as data indicative of the operation states of the feet of the operator, and leg operation commands are given to the biped locomotion robot depending on the operation states of the feet of the operator for thereby moving the legs of the biped locomotion robot in a pattern matching the movement of the feet of the operator.

More specifically, the leg operation commanding means comprises means for determining a leg of the biped locomotion robot which corresponds to the foot of the operator detected as being lifted off the ball by the foot landing/lifting detecting means, as a leg to be lifted off and landed on a floor, and applying a command indicative of a landed position and/or orientation for the leg depending on the angular displacement and/or the rotational direction of the ball as detected by the ball rotation detecting means, to the biped locomotion robot.

For moving the biped locomotion robot, the operator whose upper body is supported by the upper body support mechanism lifts one of the feet off the ball and then lowers the lifted foot onto the ball as if moving the robot with the movement of its legs. The operator moves the foot held in contact with the ball to rotate the ball such that a positional and/or orientational relationship between the feet of the operator at the time the lifted foot is landed onto the ball will correspond to a positional and/or orientational relationship between the feet of the legs of the robot when the lifted leg (swinging leg) of the robot is landed on the floor in a pattern in which the operator wants the robot to move the legs of the robot. For example, if the operator wants the robot to walk forward at a desired stride, then the operator alternately moves the feet up and down with respect to the ball. At this time, the operator moves the foot landed on the ball backward with respect to the foot lifted off the ball thereby to rotate the ball through an angular displacement that matches a stride to be achieved by a desired walking pattern for the robot (as the stride is greater, the angular displacement of the ball is greater). If the foot of the swinging leg of the robot is to be landed on the floor obliquely with respect to the foot of the supporting leg thereby to change the direction of movement of the robot when the robot is walking forward, then when the operator lands the lifted foot onto the ball, the operator orients the other foot held in contact with the ball to the foot to be landed onto the ball and rotates the ball obliquely.

While the operator is thus moving the feet relatively to the ball, the leg operation commanding means determines a leg of the biped locomotion robot which corresponds to the foot of the operator detected as being lifted off the ball by the foot landing/lifting detecting means, as a leg to be lifted off and landed on a floor, and applies a command indicative of a landed position and/or orientation for the leg depending on the angular displacement and/or the rotational direction of the ball as detected by the ball rotation detecting means, to the biped locomotion robot. Inasmuch as the angular displacement and/or the rotational direction of the ball, at this time, corresponds to the positional and/or orientational relationship between the feet of the legs of the robot when the swinging leg of the robot is landed on the floor in a pattern in which the operator wants the robot to move the legs of the robot, when a command indicative of a landed position and/or orientation for the leg depending on the angular displacement and/or the rotational direction of the ball is applied to the robot, the legs of the robot are moved in the same pattern as the operator moves the feet on the ball.

The remote control system further comprises a shoe adapted to be worn by each of the feet of the operator, the foot landing/lifting detecting means being mounted on the shoe. Therefore, the landing of each of the feet of the operator on the ball or the lifting of each of the feet of the operator off the ball can easily be detected using a contact switch or the like on the shoe. The angular displacement and/or the rotational direction of the ball can be detected by a mechanism similar to a track ball which is used to move a cursor on the display screen of a personal computer, for example.

Alternatively, the remote control system may further comprise a foot support for placing releasably thereon the feet of the operator whose upper body is supported by the upper body support mechanism, the feet of the operator being movable on the foot support, foot landing/lifting detecting means for detecting whether each of the feet of the operator is landed on or lifted off the foot support, and foot position/orientation detecting means for detecting a relative position/orientation of the feet of the operator on the foot support when one of the feet of the operator is lifted off the foot support and landed again on the foot support, the foot operation state detecting means comprising means for producing detected data from the foot landing/lifting detecting means and detected data from the foot position/orientation detecting means as data indicative of the operation states of the feet of the operator.

The operator whose upper body is supported by the upper body support mechanism moves its feet alternately up and down with respect to the foot support, and also moves the foot held in contact with the foot support, so that the feet can be moved in substantially the same pattern as when the operator is actually walking. The detected data (indicative of whether the feet are landed on or lifted off the foot support) from the foot landing/lifting detecting means and the detected data (indicative of a relative position and/or orientation of the feet of the operator on the foot support) from the foot position/orientation detecting means are representative of the operation states of the feet of the operator. The detected data from the foot landing/lifting detecting means and the detected data from the foot position/orientation detecting means are obtained as data indicative of the operation states of the feet of the operator, and leg operation commands are given to the biped locomotion robot depending on the operation states of the feet of the operator for thereby moving the legs of the biped locomotion robot in a pattern matching the movement of the feet of the operator.

More specifically, the leg operation commanding means comprises means for determining a leg of the biped locomotion robot which corresponds to the foot of the operator detected as being lifted off the foot support by the foot landing/lifting detecting means, as a leg to be lifted off and landed on a floor, and applying a command indicative of a landed position and/or orientation for the leg depending on the relative position/orientation of the feet of the operator on the foot support as detected by the foot position/orientation detecting means, to the biped locomotion robot.

For moving the biped locomotion robot, the operator whose upper body is supported by the upper body support mechanism lifts one of the feet off the foot support and then lowers the lifted foot onto the foot support as if moving the robot with the movement of its legs. The operator moves the foot held in contact with the foot support and also moves the lifted foot such that a positional and/or orientational relationship between the feet of the operator at the time the lifted foot is landed onto the foot support will correspond to a positional and/or orientational relationship between the feet of the legs of the robot when the lifted leg (swinging leg) of the robot is landed on the floor in a pattern in which the operator wants the robot to move the legs of the robot.

While the operator is thus moving the feet relatively to the foot support, the leg operation commanding means determines a leg of the biped locomotion robot which corresponds to the foot of the operator detected as being lifted off the foot support by the foot landing/lifting detecting means, as a leg to be lifted off and landed on a floor, and applies a command indicative of a landed position and/or orientation for the leg depending on the relative position and/or orientation of the feet of the operator on the foot support, as detected by the foot position/orientation detecting means, to the biped locomotion robot. Inasmuch as the relative position and/or orientation of the feet of the operator, at this time, corresponds to the positional and/or orientational relationship between the feet of the legs of the robot when the swinging leg of the robot is landed on the floor in a pattern in which the operator wants the robot to move the legs of the robot, when a command indicative of a landed position and/or orientation for the leg depending on the relative position and/or orientation of the feet of the operator is applied to the robot, the legs of the robot are moved in the same pattern as the operator moves the feet on the foot support.

The foot landing/lifting detecting means and the foot position/orientation detecting means may be arranged as follows:

The remote control system may further comprise a distributed contact sensor mounted on an upper surface of the foot support, and the foot landing/lifting detecting means comprises means for detecting whether each of the feet of the operator is landed on or lifted off the foot support based on an output signal from the distributed contact sensor, and the foot position/orientation detecting means comprises means for detecting the relative position/orientation of the feet of the operator on the foot support based on an output signal from the distributed contact sensor.

The distributed contact sensor may comprise a matrix of sensor elements for detecting whether an object contacts the distributed contact sensor or not or for detecting a contact pressure applied by an object. With the distributed contact sensor mounted on the upper surface of the foot support, it is possible to recognize a position and orientation of the feet of the operator on the foot support based on the output signal from the distributed contact sensor. Based on the output signal from the distributed contact sensor, therefore, it is possible to detect whether each of the feet of the operator is landed on or lifted off the foot support, and also to detect a relative position and/or orientation of the feet of the operator on the foot support.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
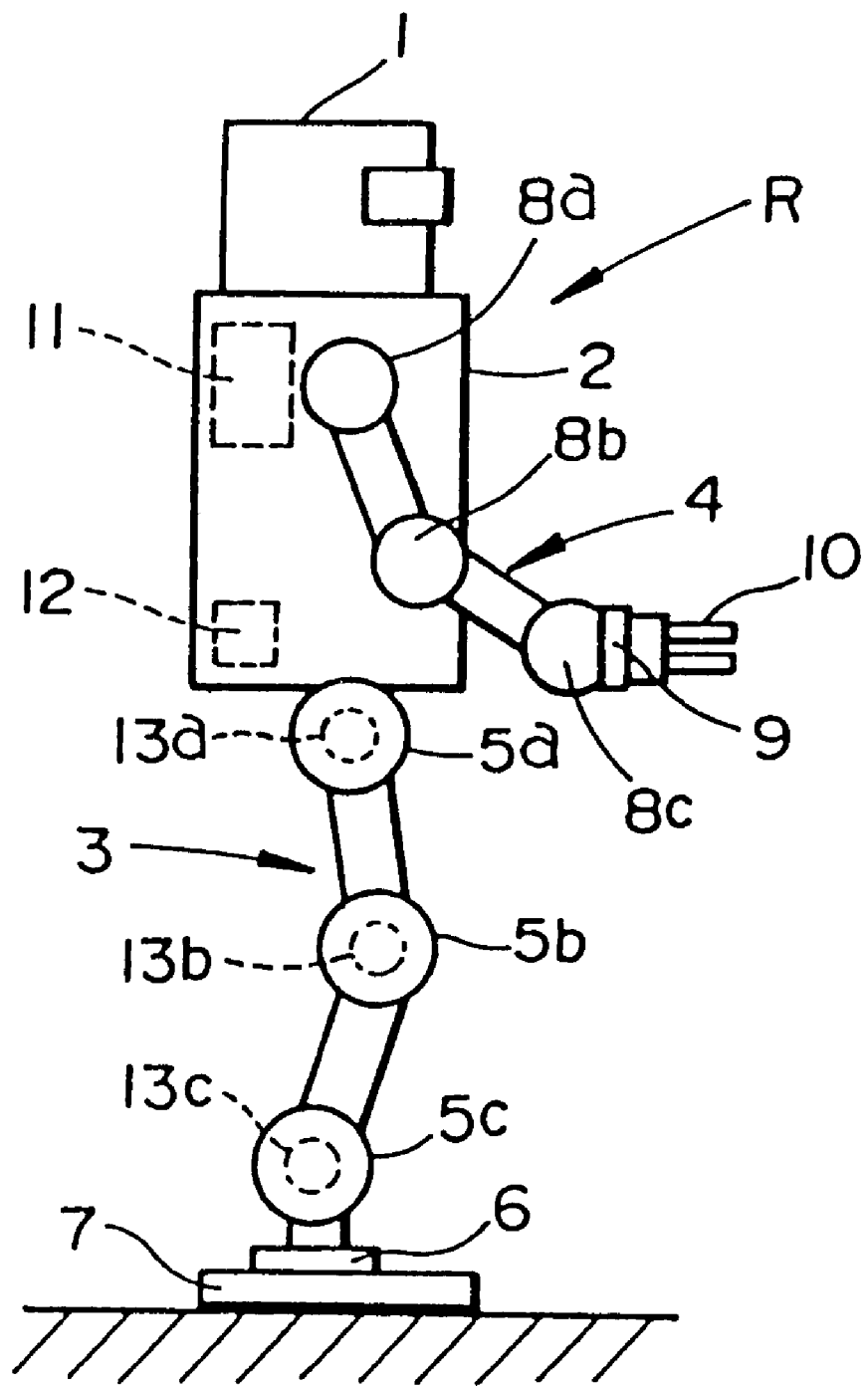
FIG. 1 is a schematic side elevational view of a biped locomotion robot controlled by a remote control system according to a first embodiment of the present invention.

Like or corresponding parts are denoted by like or corresponding reference characters throughout the views.

Figure 2:
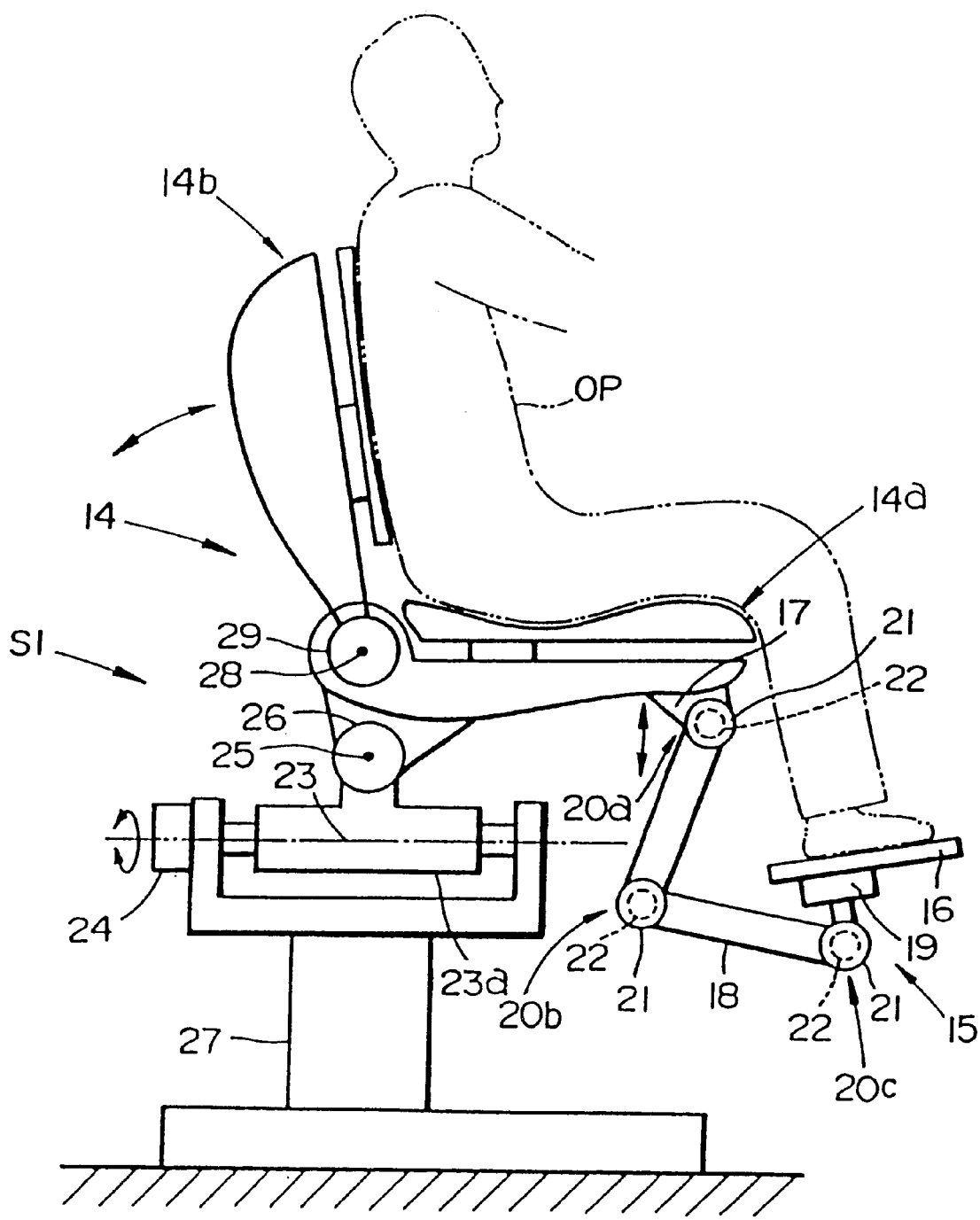
FIG. 2 is a schematic side elevational view of a robot manipulator of the remote control system according to the first embodiment of the present invention.

FIGS. 1 and 2 show, respectively, a biped locomotion robot controlled by a remote control system according to a first embodiment of the present invention, and a robot manipulator of the remote control system according to the first embodiment of the present invention. The biped locomotion robot shown in FIG. 1 can also be controlled by remote control systems according to other embodiments of the present invention.

As shown in FIG. 1, the biped locomotion robot, generally denoted by R, comprises a torso 2 supporting a head 1 on its upper end, a pair of legs 3 (only one shown) extending downwardly from a lower end of the torso 2, and a pair of arms 4 (only one shown) extending from respective upper lateral sides of the torso 2.

Each of the legs 3 has a hip joint actuator 5$a$ at a hip joint between the torso 2 and the leg 3, a knee joint actuator 5$b$ at a knee joint, and an ankle joint actuator 5$c$ at an ankle joint. A foot 7 for contacting a floor is operatively connected through a six-axis force sensor 6 to a lower end of the ankle joint actuator 5$c$. The hip joint actuator 5$a$ serves to rotate the leg 3 about three axes, i.e., a sagittal axis, a lateral axis, and a vertical axis. The knee joint actuator 5$b$ serves to rotate the leg 3 about the lateral axis. The ankle joint actuator 5$c$ serves to rotate the foot 7 about the sagittal axis and the lateral axis. The hip, knee, and ankle joint actuators 5$a$, 5$b$, 5$c$ are activated to move the leg 3 in a manner similar to the legs of human beings. The six-axis force sensor 6 serves to detect forces acting on the foot 7, i.e., force components applied to the robot R along the sagittal, lateral, and vertical axes, and moments generated about these axes.

Each of the arms 4 has a shoulder joint actuator 8a at a shoulder joint between the torso 2 and the arm 4, an elbow joint actuator 8b at an elbow joint, and a wrist joint actuator 8c at a wrist joint. A hand 10 is operatively connected through a six-axis force sensor 9 to the wrist joint actuator 8c. The shoulder joint actuator 8a serves to rotate the arm 4 about the sagittal axis, the lateral axis, and the vertical axis. The elbow joint actuator 8b serves to rotate the arm 4 about the lateral axis. The wrist joint actuator 8c serves to rotate the hand 10 about the sagittal axis, the lateral axis, and the vertical axis.

The torso 2 houses therein a robot control unit 11 for activating and controlling the actuators 5a~5c, 8a ~8c, and a tilt detector 12 including an accelerator sensor and a rate gyro for detecting a tilted state of the robot R which is indicative of an upper body orientation of the robot R. The actuators 5a~5c are associated respectively with actuator displacement detectors 13a~13c for detecting angular displacements of the respective actuators 5a~5c about the appropriate axes. Similarly, the actuators 8a~8c are associated respectively with actuator displacement detectors (not shown) for detecting angular displacements of the respective actuators 8a~8c about the appropriate axes. The actuators 5a~5c that are associated with the legs 3 will hereinafter also be referred to collectively as leg actuators 5, and the corresponding actuator displacement detectors 13a~13c as actuator displacement detectors 13.

As shown in FIG. 2, the robot manipulator, generally denoted by S1, comprises a seat assembly 14 for an operator OP, indicated by the imaginary lines, to be seated thereon, the seat assembly 14 serving as an upper body support mechanism for supporting the upper body of the operator OP. The robot manipulator S1 also has a foot support mechanism 15 for supporting the feet of the operator OP seated on the seat assembly 14. The robot manipulator S1 also has devices for operating the arms 4 of the robot R. However, such devices are omitted from illustration, and will not be described in detail below.

The foot support mechanism 15 serves as a master unit for operating the legs 3 of the robot R according to movement of the feet of the operator OP. The foot support mechanism 15 comprises a pair of foot supports 16 (only one shown) for supporting the respective feet of the operator OP who is seated on the seat assembly 14, and a pair of movable legs 18 (only one shown) each in the form of a linkage by which the foot support 16 is operatively coupled to a bracket 17 fixed to a front lower surface of a seat base 14a of the seat assembly 14. Each of the foot supports 16 is mounted on a distal end of the corresponding movable leg 18 with a six-axis force sensor 19 interposed therebetween.

The foot of the operator OP placed on each of the foot supports 16 is fastened thereto by a belt or the like (not shown). The six-axis force sensor 19 serves to detect an acting force applied from the foot of the operator OP to the foot support 16, i.e., force components applied to the foot support 16 along the sagittal, lateral, and vertical axes, and moments generated about these axes.

Each of the movable legs 18 has a joint 20a disposed on its proximal end coupled to the bracket 17, a joint 20b disposed on an intermediate portion thereof, and a joint 20c disposed on the distal end thereof. The joints 20a, 20b, 20c are associated with respective master leg actuators 21 for actuating these joints 20a, 20b, 20c. The master leg actuators 21 serve as actuating means for actuating the foot support mechanisms 15. The master leg actuator 21 associated with the joint 20a serves to rotate the movable leg 18 about the sagittal axis, the lateral axis, and the vertical axis. The master leg actuator 21 associated with the joint 20b serves to rotate the movable leg 18 about the lateral axis. The master leg actuator 21 associated with the joint 20c serves to rotate the movable foot 16 about the sagittal axis and the lateral axis. When the foot of the operator OP moves, these master leg actuators 21 are operated to move the foot support 16 in unison with the foot of the operator OP with six degrees of freedom. The master leg actuators 21 are associated with respective actuator displacement detectors 22 for detecting respective displacements of the master leg actuators 21.

The foot support mechanism 15 should preferably have certain limits added to movable ranges of the master leg actuators 21 and the movable legs 18 for preventing an excessive load from being imposed on the operator OP when the master leg actuators 21 operate out of control. In addition, the foot support mechanism 15 should preferably have counterweights and springs for balancing the weights of the movable legs 18 in order to reduce loads on the master leg actuators 21 when the foot support mechanism 15 operates.

The seat base 14a is mounted on a shaft 23a and tiltable laterally about a sagittal axis 23 by an actuator 24 so that the lateral edges of the seat base 14a will move vertically. The seat base 14a is also tiltable about a lateral axis 25 by an actuator 26 so that the front edge of the seat base 14a will move vertically. The seat assembly 14 is mounted on a base column 27 disposed vertically on a floor. The seat assembly 14 has a seatback 14b extending upwardly from a rear end of the seat base 14a and tiltable about a lateral axis 28 by an actuator 29 so that the seatback 14b will move back and forth in a sagittal plane of the operator OP. The upper body of the operator OP is fastened to the seatback 14b by a belt or the like (not shown) for movement in unison with the seatback 14b. The above structure of the seat assembly 14 allows the operator OP to indicate a tilted orientation of the upper body (torso 2) of the robot R based on a tilted orientation of the upper body of the operator OP, and to tilt the seat base 14a depending on an unstable state of the upper body of the robot R. Details of the above structure of the seat assembly 14 are disclosed in Japanese patent application No. 8-343922 and corresponding U.S. patent application Ser. No. 08/998,235 which is incorporated by this reference, and will not be described below.

Figure 3:
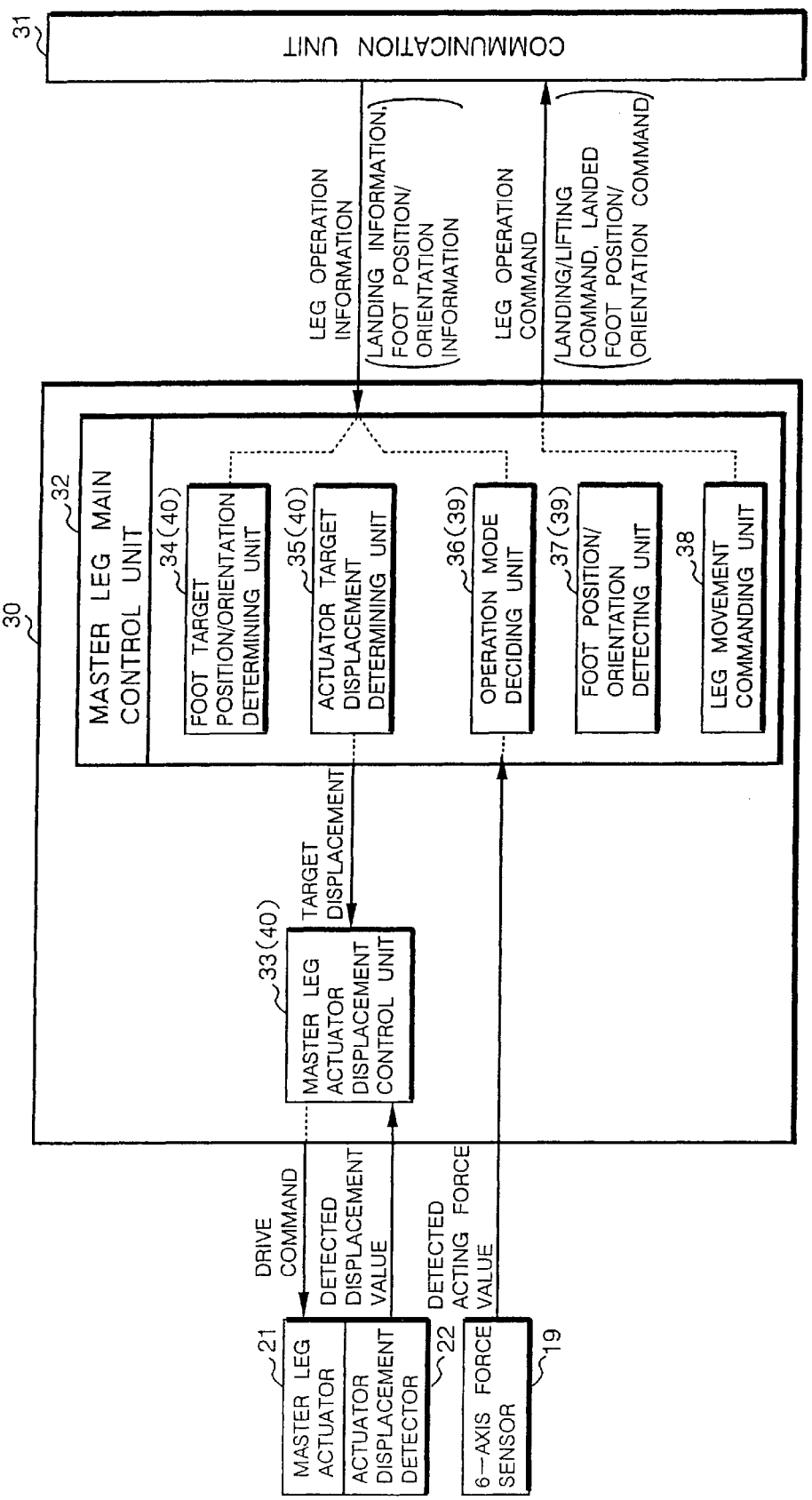
FIG. 3 is a block diagram of a control system section for the robot manipulator shown in FIG. 2.
Figure 4:
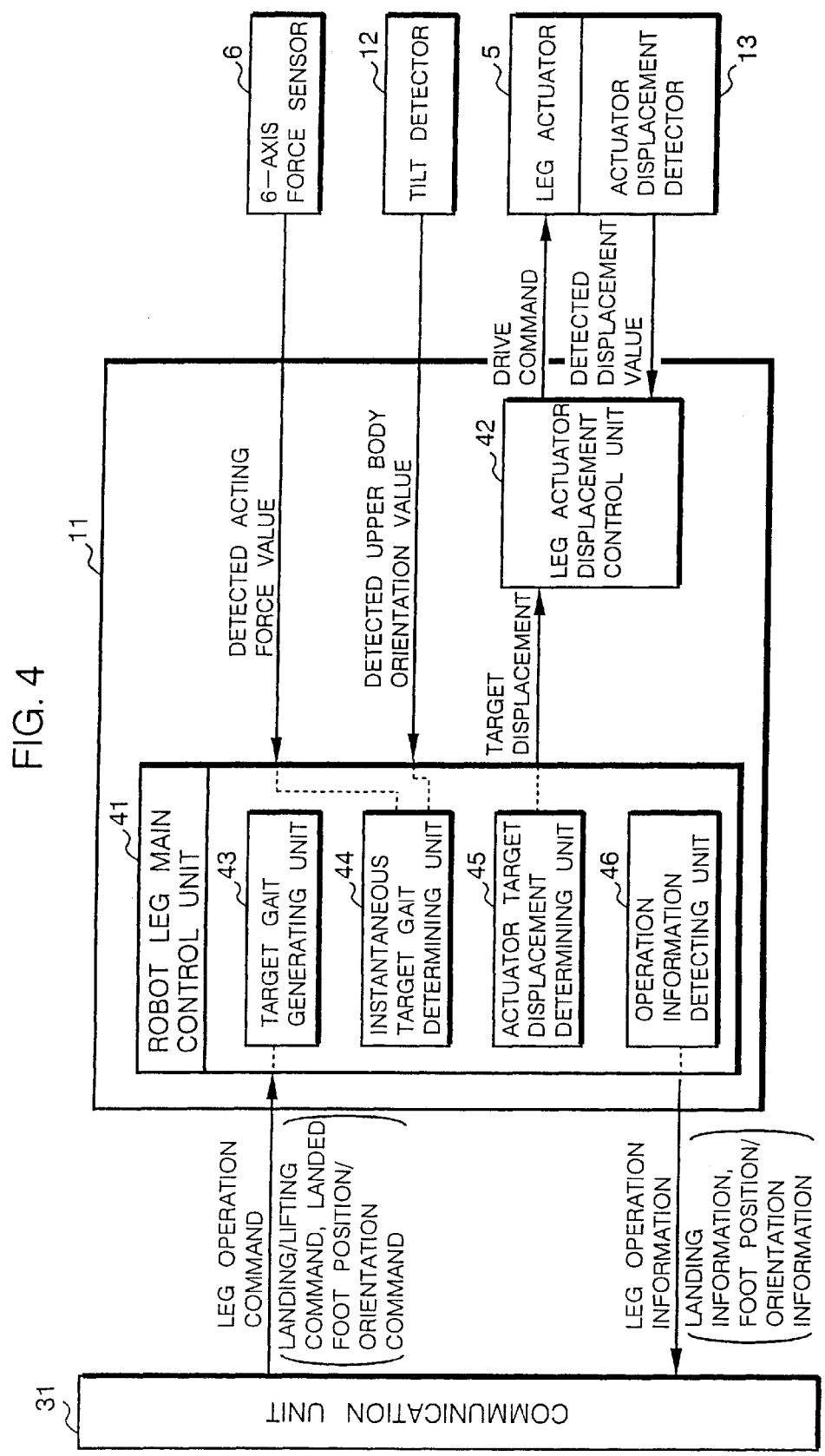
FIG. 4 is a block diagram of a control system section for the biped locomotion robot.

The remote control system according to the first embodiment of the present invention includes a control system shown in FIGS. 3 and 4 for controlling operation of the robot R and the robot manipulator S1.

The remote control system includes a master control unit 30 (see FIG. 3) disposed in the robot manipulator S1, a robot control unit 11 (see FIG. 4) disposed in the robot R, and a communication unit 31 for effecting communications between the master control unit 30 and the robot control unit 11. The communication unit 31 may be a wired or wireless communication unit.

As shown in FIG. 3, the master control unit 30 comprises a master leg control unit 32 and a master leg actuator displacement control unit 33 for controlling operation of the foot support mechanism 15.

The master leg control unit 32 comprises, as its functions, a foot target position/orientation determining unit 34 for determining a target position/orientation for each of the foot supports 16 of the foot support mechanism 15, an actuator target displacement determining unit 35 for calculating and determining a target displacement for each of the master leg actuators 21, an operation mode deciding unit 36 for deciding an operation mode of each of the feet of the operator OP supported on and fixed to the foot supports 16, i.e., an operation mode of the foot support mechanism 15, a foot position/orientation detecting unit 37 for detecting a relative position/orientation of the feet of the operator OP, and a leg movement commanding unit 38 for sending a leg movement command to move the legs 3 of the robot R through the communication unit 31 to the robot control unit 11. The operation mode deciding unit 36 and the foot position/orientation detecting unit 37 jointly serve as a foot operation state detecting means 39, and the foot target position/orientation determining unit 34, the actuator target displacement determining unit 35, and the master leg actuator displacement control unit 33 jointly serve as a foot support mechanism control means 40.

Operation modes of each of the feet of the operator OP as decided by the operation mode deciding unit 36 include a landing mode, an aerial mode, and a lowering mode. The landing mode is a mode corresponding to the operation of the leg 3 (supporting leg) as it lands on the floor while the robot R is walking. The aerial mode is a mode corresponding to the lifting operation of the leg 3 (swinging leg) as it leaves the floor while the robot R is walking. The lowering mode is a mode corresponding to the operation of the leg 3 (swinging leg) as it is lowered and about to be landed while the robot R is walking. From the time when supplied with landing information (described later on) of the swinging leg 3 from the robot control unit 11 through the communication unit 31, the operation mode deciding unit 36 judges the operation mode of the foot of the operator OP corresponding to the swinging leg 3 as the landing mode. From the time when the six-axis force sensor 19 on the foot support 16 corresponding to the foot in the landing mode detects an upward acting force due to a lifting action of the foot, the operation mode deciding unit 36 judges the operation mode of the foot of the operator OP as the aerial mode. From the time when a lowering speed of the foot support 16 corresponding to the foot in the aerial mode exceeds a predetermining setting, the operation mode deciding unit 36 judges the operation mode of the foot of the operator OP as the lowering mode. The lowering speed of the foot support 16 is detected as a rate of change in the target position/orientation of the foot support 16 which is determined by the foot target position/orientation determining unit 34 as described later on. Alternatively, the lowering speed of the foot support 16 may be detected by a speed sensor or the like.

The foot target position/orientation determining unit 34 determines a target position/orientation for each of the foot supports 16 in each control cycle time depending on the operation mode detected by the operation mode deciding unit 36. Specifically, for the foot support 16 corresponding to the foot of the operator OP whose operation mode is the landing mode, the foot target position/orientation determining unit 34 determines a target position/orientation such that a position/orientation of the foot support 16 with respect to the upper body of the operator OP, e.g., the hip of the operator OP, corresponds to a position/orientation of the foot 7 of the leg (supporting leg) of the robot R with respect to the upper body of the robot R, e.g., the hip of the robot R, given from the robot control unit 11 through the communication unit 31. For the foot support 16 corresponding to the foot of the operator OP whose operation mode is the aerial mode or the lowering mode, the foot target position/orientation determining unit 34 determines a target position/orientation in order to change the position/orientation of the foot support 16 in a direction to reduce an acting force detected by the six-axis force sensor 19 associated with the foot support 16.

The actuator target displacement determining unit 35 calculates and determines a target displacement for each of the master leg actuators 21 from a target position/orientation for each of the foot supports 16 which has been determined by the foot target position/orientation determining unit 34.

The foot position/orientation detecting unit 37 detects a relative position/orientation relationship between target positions/orientations of the foot supports 16 determined by the foot target position/orientation determining unit 34, as a relative position/orientation of the feet of the operator OP. Such a relative position/orientation relationship of the foot supports 16 may be detected on the basis of displacement values of the master leg actuators 21 as detected by the actuator displacement detectors 22.

The leg movement commanding unit 38 sends an operation mode detected by the operation mode deciding unit 36 as a landing/lifting command for landing/lifting the legs 3 of the robot R, through the communication unit 31 to the robot control unit 11. When the operation mode becomes the lowering mode, the leg movement commanding unit 38 determines a landing foot position/orientation command which determines a landing position/orientation of the foot 7 of the swinging leg 3 of the robot R with respect to the foot 7 of the supporting leg 3 of the robot R, based on the relative position/orientation relationship of the feet of the operator OP as detected by the foot position/orientation detecting unit 37, and sends the determined landing foot position/orientation command through the communication unit 31 to the robot control unit 11.

The master leg actuator displacement control unit 33 controls displacements of the master leg actuators 21 at a target displacement through a feedback control loop, based on the target displacement determined by the actuator target displacement determining unit 35 of the master leg main control unit 32 and displacement values of the master leg actuators 21 as detected by the actuator displacement detectors 22.

The master control unit 30 also has control units (not shown) for controlling operation of the seat assembly 14 to give, to the robot R, an upper body orientation command to tilt the upper body of the robot R depending on a tilted orientation of the seatback 14b of the seat assembly 14, and also to tilt the seat base 14a of the seat assembly 14 depending on an unstable state of the upper body of the robot R. Details of such control units are disclosed in Japanese patent application No. 8-343922 and corresponding U.S. patent application Ser. No. 08/998,235 which is incorporated by this reference, and will not be described below.

As shown in FIG. 4, the robot control unit 11 comprises a robot leg main control unit 41 and a leg actuator displacement control unit 42 for controlling operation of the leg actuators 5 of the robot R.

The robot leg main control unit 41 comprises, as its functions, a target gait generating unit 43 for generating a basic target gait which determines an operation pattern (walking pattern) for each of the legs 3 of the robot R, an instantaneous target gait determining unit 44 for determining an instantaneous value of the target gait in each control cycle, an actuator target displacement determining unit 45 for calculating and determining a target displacement for each of the leg actuators 5 of the robot R, and an operation information detecting unit 46 for detecting operation information of the legs 3 of the robot R to be supplied to the master control unit 30.

The target gait generated by the target gait generating unit 43 is composed of parameters which describe such features as a target foot position/orientation for each of the feet 7 of the robot R, a target trajectory for the center of a reactive force applied from the floor to the foot 7 of the supporting leg 3 while the robot R is walking, and a target orientation for the upper body (torso 2) of the robot R, i.e., a target tilt angle for the upper body of the robot R. The target gait generating unit 43 generates the above parameters, for one step of the legs 3, for example, according to a landing/lifting command (operation mode) and a landing foot position/ orientation command which are supplied from the master control unit 30 and an upper body orientation command depending on the tilt of the seatback 14b of the seat assembly 14. The target trajectory for the center of a reactive force applied from the floor to the foot 7 of the supporting leg 3 is generated so as to lie in a polygon of minimum area (generally known as a "support polygon") including the floor touching surface of the foot 7 or the floor touching surfaces of both feet 7.

Generation of the target gait is disclosed in detail in Japanese laid-open patent publication No. 5-318340 and the corresponding U.S. Pat. Ser. No. 5,357,433 incorporated herein by this reference, for example, and will not be described below.

The instantaneous target gait determining unit 44 calculates an instantaneous value of the target gait in each control cycle from the basic target gait generated by the target gait generating unit 43, and corrects the calculated instantaneous value into a final instantaneous value of the target gait. For correcting the calculated instantaneous value, the instantaneous target gait determining unit 44 effects an orientation stabilizing control process for stabilizing the orientation of the robot R depending on detected values from the six-axis sensors 6 (an acting force applied from the floor to the feet 7) and a tilted orientation of the upper body (torso 2) of the robot R which is detected by the tilt detector 12 in order to prevent the robot R from being orientated unstably and hence from falling down. In the orientation stabilizing control process, the instantaneous target gait determining unit 44 corrects the target foot position/orientation in the basic target gait depending on the detected values from the six-axis force sensors 6 in order to cause the feet 7 to absorb reactive forces applied from the floor to the feet 7 due to unexpected floor surface irregularities or slants, according to a so-called compliance control process. The instantaneous target gait determining unit 44 also corrects the target foot position/orientation depending on the difference between the target orientation for the upper body of the robot R and the detected value from the tilt detector 12 at the basic target gait in order to cause reactive forces to act on the feet 7 from the floor in a direction to recover the orientation of the upper body of the robot R. Furthermore, the instantaneous target gait determining unit 44 corrects the target orientation for the upper body of the robot R depending on the difference between the target orientation for the upper body of the robot R and the detected value from the tilt detector 12 at the basic target gait in order to generate an inertial force of the upper body of the robot R in a direction to recover the orientation of the upper body of the robot R. The instantaneous target gait determining unit 44 may correct the position of the upper body of the robot R in addition to the orientation thereof.

The above orientation stabilizing control process is disclosed in detail in Japanese laid-open patent publication No. 5-337849 and the corresponding U.S. Pat. Ser. No. 5,459, 659 which is incorporated by this reference, and will not be described below.

The actuator target displacement determining unit 45 calculates a target displacement for each of the leg actuators 5 of the robot R from a final instantaneous value of the target gait which has been determined by the instantaneous target gait determining unit 44.

The operation information detecting unit 46 functions as robot foot position/orientation detecting means for detecting a position/orientation of the foot 7 of the supporting leg 3 of the robot R with respect to the upper body (hip) of the robot R. The operation information detecting unit 46 detects a position/orientation of the foot 7 of the supporting leg 3 of the robot R with respect to the upper body of the robot R based on a target displacement for each of the leg actuators 5 which has been determined by the actuator target displacement determining unit 45. A position/orientation of the foot 7 may be detected on the basis of an instantaneous value of the target gait determined by the instantaneous target gait determining unit 44 or displacement values of the leg actuators 5 which are detected by the actuator displacement detectors 13.

The operation information detecting unit 46 also functions as means for detecting landing of the swinging leg 3 while the robot R is walking. For example, the operation information detecting unit 46 detects landing of the swinging leg 3 based on an acting force, detected by the six-axis force sensor 6, which is applied to the foot 7 of the swinging leg 3. The operation information detecting unit 46 transmits information of the detected position/orientation of the foot 7 with respect to the upper body of the robot R and information of the detected landing of the swinging leg 3, through the communication unit 31 to the master leg control unit 32 of the master control unit 30.

The leg actuator displacement control unit 42 controls displacements of the leg actuators 5 at a target displacement through a feedback control loop, based on the target displacement determined by the actuator target displacement determining unit 45 of the robot leg main control unit 41 and displacement values of the leg actuators 5 which are detected by the actuator displacement detectors 13.

Operation of the remote control system for walking (moving) the robot R will be described below.

If the operator OP seated on the seat assembly 14 is to control the robot R to walk, the operator OP moves his own feet placed on and fastened to the foot supports 16 in a walking pattern according to which the operator OP wants the robot R to walk. Specifically, the operator OP lifts the foot to be moved, and lowers the foot to a position in and with an orientation with which the operator OP wants the robot R to land on a floor or the like. The operator OP repeats such an action with respect to each of the legs.

Figure 5:
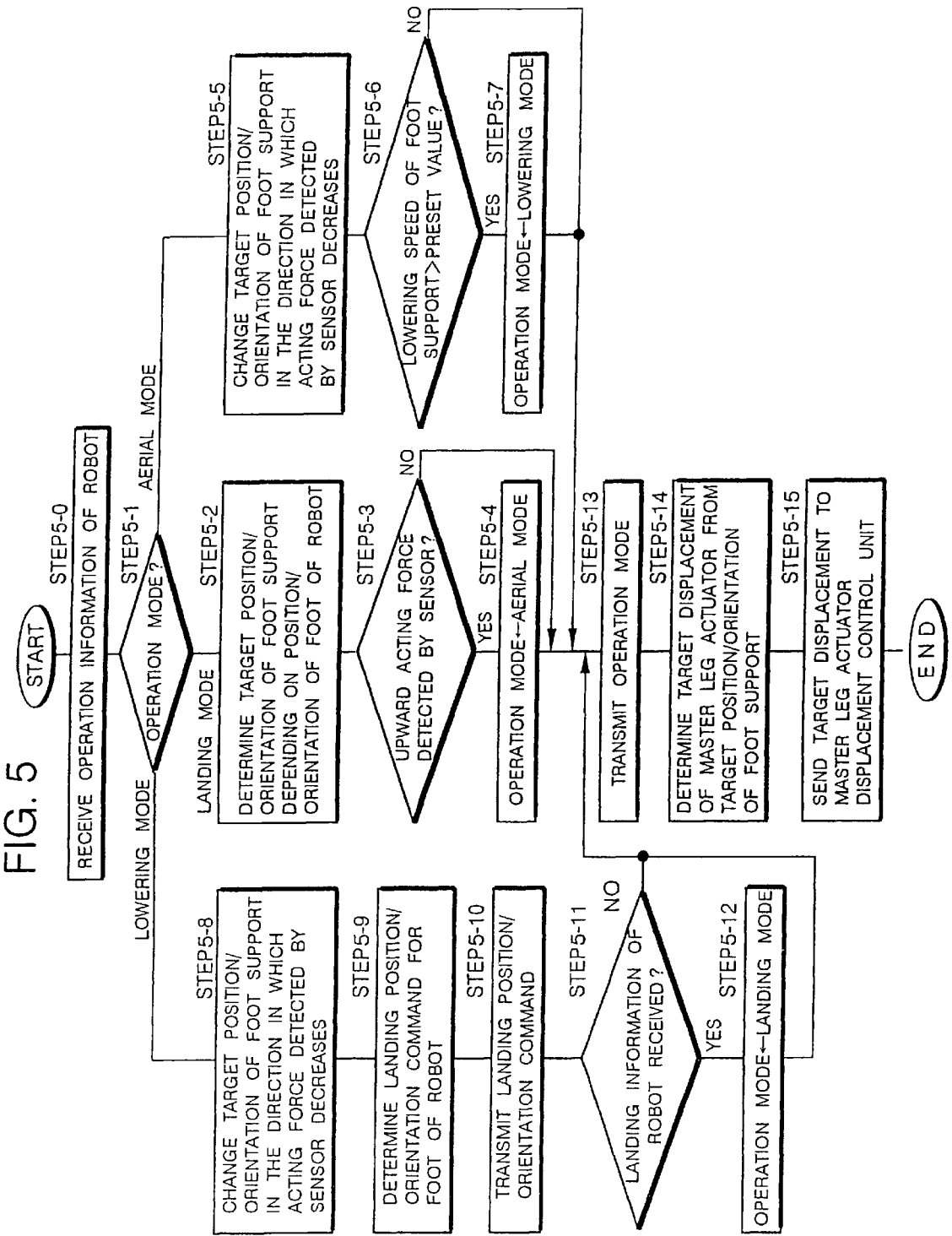
FIG. 5 is a flowchart of an operation sequence of the control system section shown in FIG. 3.

At this time, the master leg main control unit 32 carries out an operation sequence shown in FIG. 5 in predetermined control cycles for each of the master legs 18 of the foot support mechanism 15.

As shown in FIG. 5, the master leg main control unit 32 receives leg operation information of the robot R (landing information and foot position/orientation information of the robot R) from the robot control unit 11 through the communication unit 31 in STEP5-0, and then determines an operation mode of the feet of the operator OP which is presently recognized by the operation mode deciding unit 36 in STEP5-1. The initial operation of the robot R which is recognized by the operation mode deciding unit 36 when the robot R starts to be manipulated is the landing mode.

If the operation mode is the landing mode in STEP5-l, then the foot target position/orientation determining unit 34 determines a target position/orientation of the foot support 16 (a target position/orientation with respect to the hip of the operator OP) depending on the position/orientation information of the foot 7 of the present supporting leg 3 of the robot R with respect to the upper body (the hip) of the robot R, which information is supplied from the robot leg main control unit 41 of the robot control unit 11, in STEP5-2. Specifically, a target position/orientation of the foot support 16 corresponding to the supporting leg 3 of the robot R is determined such that its position/orientation relationship to the hip of the operator OP is the same as the position/orientation relationship of the foot 7 of the leg 3 to the hip of the robot R.

The operation mode deciding unit 36 of the master leg main control unit 32 ascertains whether or not an upward acting force is detected by the six-axis force sensor 19 in STEP5-3. If an upward acting force is detected, i.e., if the operator OP lifts the foot, then the operation mode deciding unit 36 recognizes that the operation mode of the foot of the operator OP has changed from the landing mode to the aerial mode in STEP5-4, after which the control proceeds to STEP5-13. If no upward acting force is detected, then the control jumps from STEP5-3 to STEP5-13 while the operation mode deciding unit 36 is recognizing the landing mode.

If the operation mode decided by the operation mode deciding unit 36 is the aerial mode in STEP5-1, then the foot target position/orientation determining unit 34 of the master leg main control unit 32 changes the present target position/orientation of the foot support 16 in the direction in which the acting force detected by the six-axis force sensor 19 decreases, thus determining a new target position/orientation in STEP5-5. Stated otherwise, the foot target position/orientation determining unit 34 determines a target position/orientation for the foot support 16 in order for the foot support 16 to follow movement of the foot of the operator OP placed on the foot support 16. Then, the operation mode deciding unit 36 decides whether a lowering speed of the target position/orientation of the foot support 19 exceeds a preset value or not in STEP5-6. If the lowering speed is greater than the preset value, i.e., if the operator OP moves its foot intending to land the swinging leg 3 of the robot R, then the operation mode deciding unit 36 recognizes that the operation mode of the foot of the operator OP has changed from the aerial mode to the lowering mode in STEP5-7, after which the control proceeds to STEP5-13. If the lowering speed is smaller than or equal to the preset value in STEP5-6, then control jumps from STEP5-6 to STEP5-13 while the operation mode deciding unit 36 is recognizing the aerial mode.

If the operation mode decided by the operation mode deciding unit 36 is the lowering mode in STEP5-1, then the foot target position/orientation determining unit 34 of the master leg main control unit 32 changes the present target position/orientation of the foot support 16 in the direction in which the acting force detected by the six-axis force sensor 19 decreases, thus determining a new target position/orientation in order for the foot support 16 to follow movement of the foot of the operator OP in STEP5-8. Then, the leg movement commanding unit 38 of the master leg main control unit 32 determines a landing foot position/orientation command for the foot 7 of the leg 3 corresponding to the foot in the lowering mode to be landed, based on a relative positional relationship between the target position/orientation of the foot support 16 which supports the foot of the operator OP in the present lowering mode, as detected by the foot position/orientation detecting unit 37, and the other foot support 16 which supports the other foot (the foot in the landing mode), in STEP5-9. The leg movement commanding unit 38 transmits the determined position/orientation command through the communication unit 31 to the robot leg main control unit 41 in STEP5-10. The leg movement commanding unit 38 may determine a landed foot position/orientation command from a relative position/orientation relationship between the feet of the operator OP at the present time (when the operation mode changes from the aerial mode to the lowering mode), but may also determine a landed foot position/orientation command from a relative position/orientation relationship between positions/orientations of the feet predicted from a rate of change in the present positions/orientations of the feet of the operator OP.

The operation mode deciding unit 36 then ascertains whether it has received landing information indicating that the leg 3 of the robot R corresponding to the foot in the lowering mode of the operator OP is landed, from the robot leg main control unit 41, in STEP5-11. If the operation mode deciding unit 36 has received the landing information, then the operation mode deciding unit 36 recognizes that the operation mode of the foot of the operator OP changes from the aerial mode to the landing mode in STEP5-12, after which the control proceeds to STEP5-13. If the operation mode deciding unit 36 has not received the landing information, then the control jumps from STEP5-11 to STEP5-13 while the operation mode deciding unit 36 is recognizing the lowering mode.

In STEP5-13, the leg movement commanding unit 38 transmits the operation mode presently detected by the operation mode deciding unit 36 as a landing/lifting command for the foot 7 of the robot R through the communication unit 31 to the robot leg main control unit 41.

Thereafter, the actuator target displacement determining unit 35 determines target displacements of the master leg actuators 21 corresponding to the present target position/orientation of the foot supports 16 in STEP5-14. Then, the actuator target displacement determining unit 35 sends the determined target displacements to the master leg actuator displacement control unit 33 in STEP5-15, whereupon the present control cycle is finished.

When supplied with the determined target displacements from the master leg main control unit 32, the master leg actuator displacement control unit 33 controls the master leg actuators 21 according to the given target displacements through a feedback control loop.

The above control process carried out by the master control unit 30 controls the foot support 16 for the supporting leg 3 of the robot R into a position/orientation corresponding to the relative position/orientation of the foot 7 with respect to the upper body (hip) of the robot R, and also controls the foot support 16 for the swinging leg 3 to move depending on the movement of the foot of the operator OP.

The operation modes of the foot support 16 further include, in addition to the above three operation modes, a lock mode in which a manipulation start switch (not shown) is turned off. In the lock mode, the foot supports 16 are locked against movement.

Figure 6:
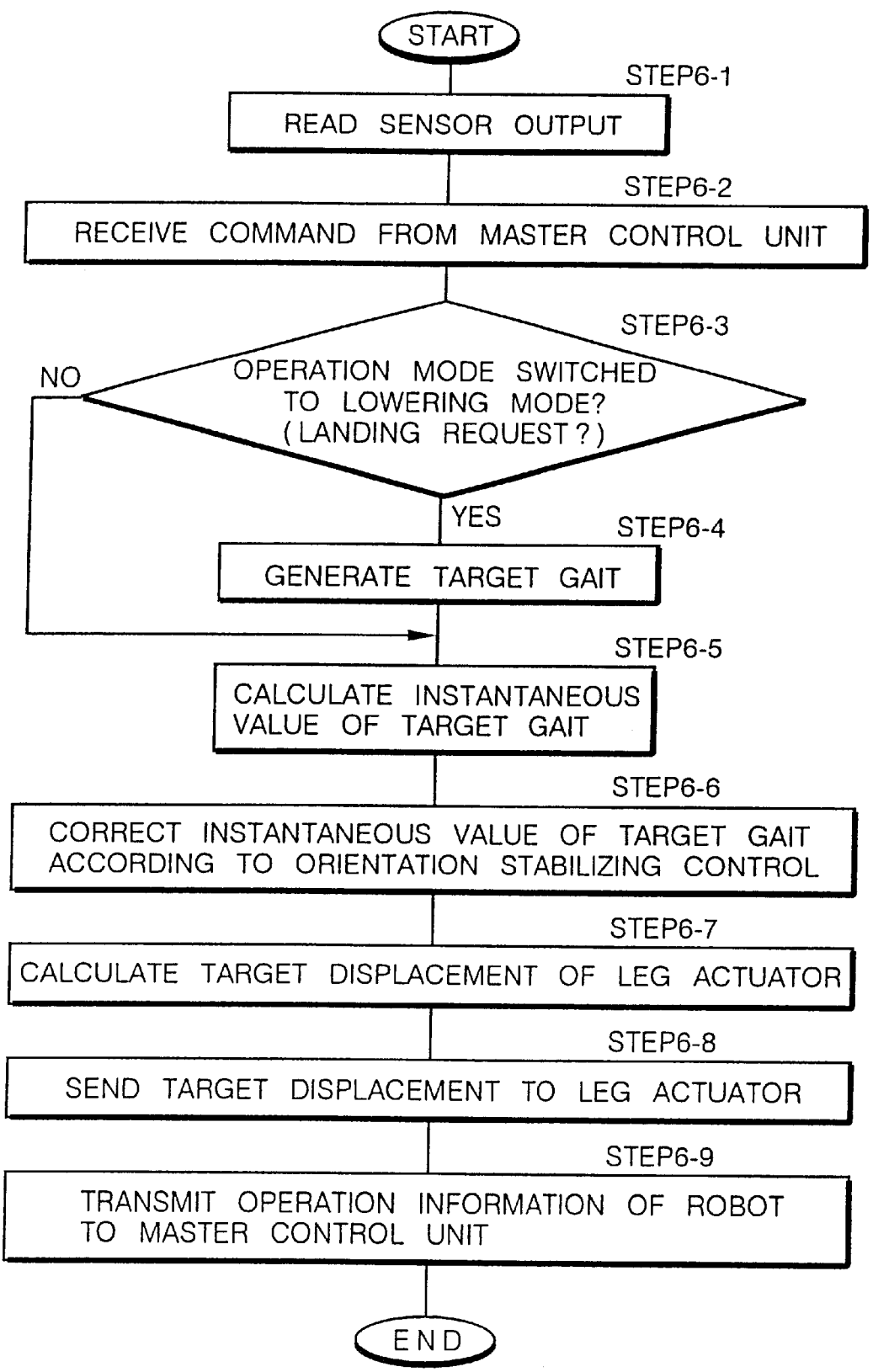
FIG. 6 is a flowchart of an operation sequence of the control system section shown in FIG. 4.

When the robot manipulator S1 operates as described above to manipulate the legs 3 of the robot R, the robot leg main control unit 41 on the robot R carries out an operation sequence shown in FIG. 6 in predetermined control cycles.

As shown in FIG. 6, the robot leg main control unit 41 reads output signals from various sensors including the tilt detector 12 and the six-axis force sensor 6 in STEP6-1, and then receives leg operation commands (a landing/lifting command (an operation mode) and a foot position/ orientation command for the foot 7 when landed) supplied through the communication unit 31 from the master control unit 31 in STEP6-2.

Then, the robot leg main control unit 41 decides whether the operation mode of either one of the feet of the operator OP has switched from the aerial mode to the lowering mode (whether there is a landing request or not) in STEP6-3. If the operation mode has switched from the aerial mode to the lowering mode, then the target gait generating unit 43 of the robot leg main control unit 41 generates a target gait according to the leg movement command, for one step of the leg 3 (presently in the landed state) of the robot R corresponding to the foot of the operator OP whose operation mode has switched to the lowering mode in STEP6-4. If the operation mode of either one of the feet of the operator OP has not changed from the aerial mode to the lowering mode in STEP6-3, i.e., if one of the feet of the operator OP is in the landing mode and the other in the aerial mode, then no target gait is generated in STEP6-4 because a target gait has already been generated.

The instantaneous target gait determining unit 44 calculates an instantaneous value of the target gait in the present control cycle from the basic target gait thus generated by the target gait generating unit 43 in STEP6-5. Thereafter, the instantaneous target gait determining unit 44 effects the orientation stabilizing control process to correct the calculated instantaneous value of the target gait in STEP6-6.

The actuator target displacement determining unit 45 calculates a target displacement of each of the leg actuators 5 of each leg 3 in the present control cycle, corresponding to the instantaneous value, from the corrected instantaneous value of the target gait in STEP6-7, and sends the calculated target displacement as a command to the leg actuator displacement control unit 42 in STEP6-8. At this time, the leg actuator displacement control unit 42 controls each of the leg actuators 5 to be displaced by the calculated target displacement according to the supplied command through a feedback control loop.

Thereafter, the robot leg main control unit 41 transmits leg operation information indicative of the present foot position/ orientation of the supporting leg 3 of the robot R (the relative position/orientation of the foot 7 with respect to the upper body of the robot R) and the landing information of the swinging leg 3, as detected by the operation information detecting unit 46 in the present control cycle, through the communication unit 31 to the master control unit 30 in STEP6-9, whereupon the present control cycle is finished.

The above operation of the robot R enables the robot R to automatically stabilize its own orientation while the robot R is walking in substantially the same pattern as the feet of the operator OP. At this time, the movement of the legs 3 of the robot R is one step delayed with respect to the movement of the feet of the operator OP.

With the above remote control system, since the operator OP instructs the robot R to move its legs 3 with the movement of the feet of the operator OP, and the legs 3 of the robot P are moved as instructed, the operator OP can perceptively recognize the movement of its own feet as the actual movement of the legs 3 of the robot R, for thereby reliably moving the legs 3 of the robot R as desired.

In this embodiment, a position/orientation for the leg 3 of the robot R to be landed is defined by a relative position/ orientation relationship between the position/orientation of the foot of the operator OP in the lowering mode and the position/orientation of the other foot of the operator OP in the landing mode. Therefore, by lowering the lifted foot (corresponding to the swinging leg 3 of the robot R) toward a desired position/orientation with respect to the other foot (corresponding to the supporting leg 3), the operator OP can control the robot R to walk with such a stride and in such a direction as if the operator OP actually walked.

The position/orientation of the foot of the operator OP which corresponds to the supporting leg 3 of the robot R is controlled into the same position/orientation as the foot of the leg 3 of the robot R with respect to the upper body (hip) of the operator OP. Therefore, the operator OP can perceptively recognize what position/orientation relationship the position/orientation of the foot 7 of the supporting leg 3 has with respect to the upper body of the robot R, with the position/orientation of the foot of the operator OP. For example, for controlling the robot R to walk up steps, the foot 7 of the supporting leg 3 moves downwardly with respect to the upper body of the robot R, and the foot of the operator OP also moves downwardly with respect to the upper body of the operator OP. Therefore, the operator OP while seated on the seat assembly 14 can obtain a feel as if walking on the same floor configuration as the floor configuration on which the robot R is walking. The operator OP can accurately manipulate the robot R with such a feel.

Since the operator OP can obtain a feel as if walking on the same floor configuration as the floor configuration on which the robot R is walking, the operator OP can accurately manipulate the robot R under a wide variety of environmental conditions with a feel as if the operator OP walked under such a wide variety of environmental conditions.

The foot supports 16 for supporting the feet of the operator OP are actuated so as to follow the movement of the feet of the operator OP. Therefore, the operator OP does not need substantial efforts to move its own feet, and can easily manipulate the robot R.

In this embodiment, an acting force applied from the feet of the operator OP to the foot supports 16 of the robot manipulator S1 is detected by the six-axis sensors 19. However, an acting force applied to the foot supports 16 may be detected by sensors which detect actuating forces of the master leg actuators 21. In this case, it will be necessary to compensate for effects of the weights and inertial forces of the movable legs 18.

While the foot support mechanism 15 is in the form of a linkage in the illustrated embodiment, it may comprise an XYZ table or the like. Alternatively, shoes worn by the operator OP may be suspended by wires that can be wound by rotatable drums, and positions/orientations of the shoes may be controlled depending on the movement of the feet of the operator OP by winding the wires on the rotatable drums and unwinding the wires from the rotatable drums.

In this embodiment, no command is issued from the robot manipulator S1 with respect to a position/orientation and a movement trajectory in midair for the swinging leg 3 of the robot R. However, a position/orientation and a movement trajectory of the foot of the operator OP in the aerial mode may be given as commands to the robot R.

In this embodiment, a landing movement (a movement from the aerial mode to the lowering mode) of the foot of the operator OP on the robot manipulator S1 is judged on the basis of the lowering speed of the foot of the operator OP. However, a landing movement (an intention to land) of the foot of the operator OP may be judged from a lowering acceleration of the foot, a rate of change in such a lowering acceleration of the foot, a detected value from the six-axis force sensor 19, or a rate of change in such a detected value. Alternatively, each of the foot supports 16 may have a switch operable by a toe of the foot of the operator OP, and the operator's intention to land the foot may be judged on the basis of whether the switch is operated or not.

In the embodiment, the seatback 14b and the seat base 14a of the seat assembly 14 are movable for manipulating the robot R. However, if the orientation of the upper body of the robot R is instructed by another manipulator or if it is not necessary to tilt the upper body of the robot R, then the seat assembly 14 may be a fixed seat assembly, i.e., a seat assembly free of actuators.

A remote control system according to a second embodiment of the present invention will be described below with reference to FIGS. 1 and 7 through 12.

The remote control system according to the second embodiment serves to remotely control the biped locomotion robot R shown in FIG. 1.

Figure 7:
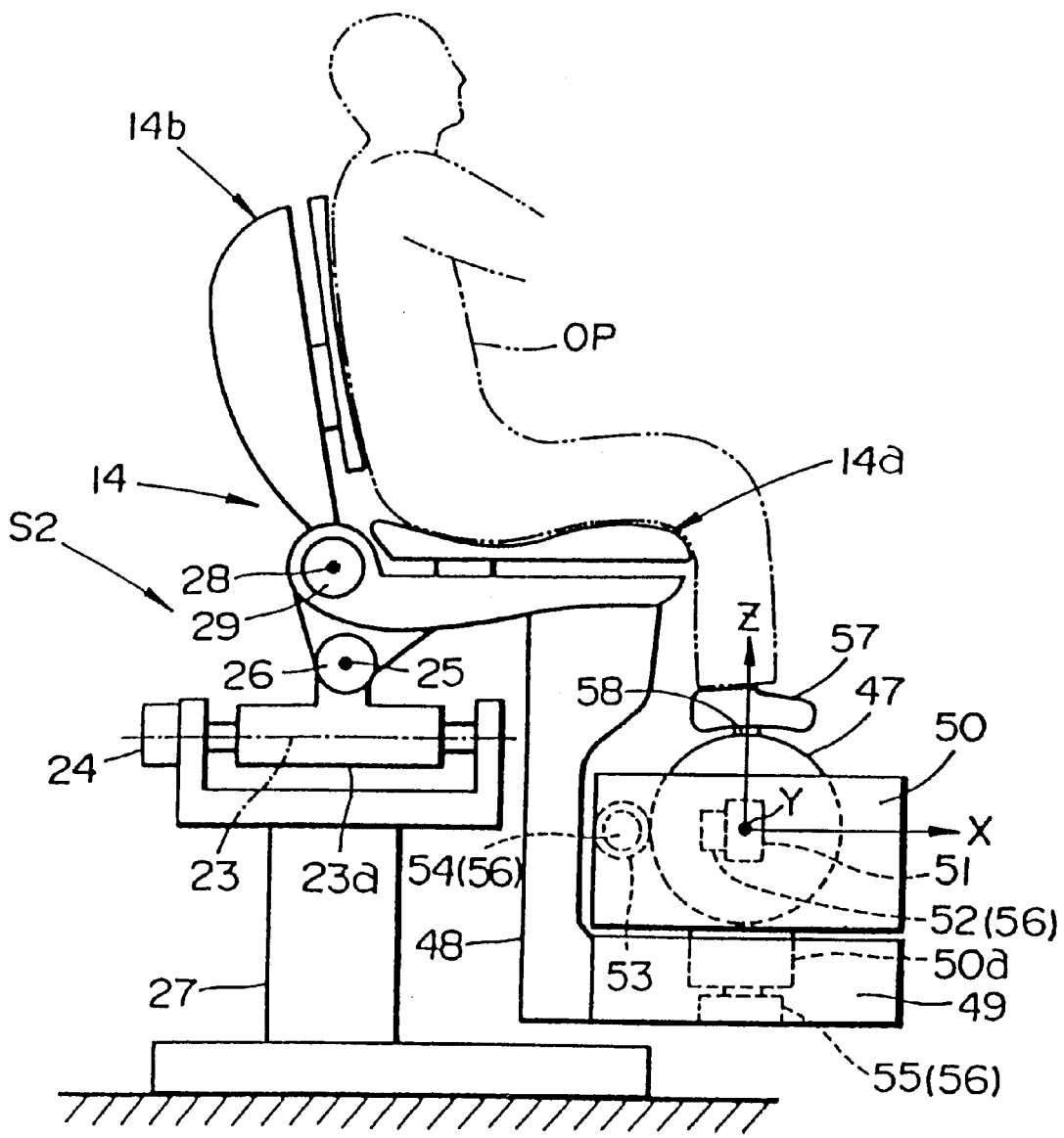
FIG. 7 is a schematic side elevational view of a robot manipulator of a remote control system according to a second embodiment of the present invention.

FIG. 7 shows a robot manipulator S2 for manipulating the robot R in the remote control system according to the second embodiment. As shown in FIG. 7, the robot manipulator S2 has a seat assembly 14, which is the same as the seat assembly 14 according to the first embodiment, as an upper body support mechanism for supporting the upper body of the operator OP. The robot manipulator S2 also has a ball 47 for placing thereon the feet of the operator OP seated on the seat assembly 14 for manipulating the legs 3 of the robot R. As with the first embodiment, the robot manipulator S2 also has devices for operating the arms 4 of the robot R.

Figure 8:
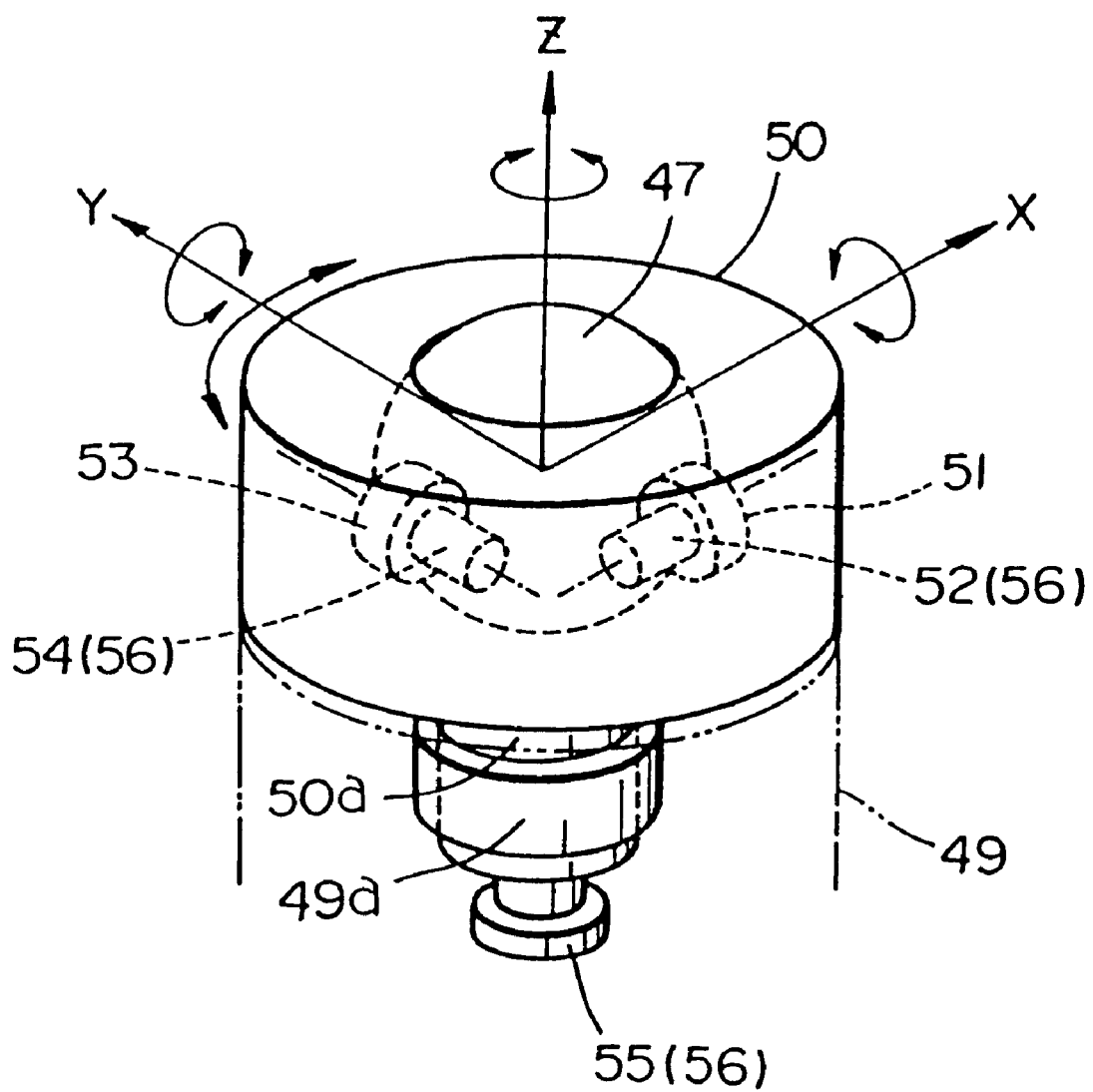
FIG. 8 is a perspective view of a portion of the robot manipulator shown in FIG. 7.

A ball support fixed base 49 which supports the ball 47 is fixed by a bracket 48 to a front lower side of the seat base 14a of the seat assembly 14. The ball 47 is held by a rotary base 50 which is mounted on the fixed base 49 for rotation about a vertical Z-axis. As shown in FIG. 8, the rotary base 50 has a shaft 50a projecting downwardly from the center of a lower surface thereof into the fixed base 49. The shaft 50a is rotatably supported in the fixed base 49 by a bearing 49a, so that the rotary base 50 is rotatable on the fixed base 49 about the Z-axis. The ball 47 has a lower portion housed in the rotary base 50 and supported thereon so as to be rotatable both clockwise and counterclockwise about the Z-axis in unison with the rotary base 50 and also rotatable about an X-axis in the sagittal plane and a Y-axis in the lateral plane, as shown in FIGS. 7 and 8.

As shown in FIG. 8, the rotary base 50 houses therein a rotatable roller 51 having an outer circumferential surface held in pressing contact with a side surface (in the direction of the Y-axis) of the ball 47, a rotary encoder 52 for detecting an angular displacement (rotational angle) about the X-axis of the ball 47 based on an angular displacement of the roller 51, a rotatable roller 53 having an outer circumferential surface held in pressing contact with a side surface (in the direction of the X-axis) of the ball 47, and a rotary encoder 54 for detecting an angular displacement (rotational angle) about the Y-axis of the ball 47 based on an angular displacement of the roller 53. The fixed base 49 houses a rotary encoder 55 mounted on a lower end of the shaft 50a of the rotatable base 50, which rotates about the Z-axis in unison with the ball 47, for detecting an angular displacement (rotational angle) about the Z-axis of the ball 47. The rotary encoders 52, 54, 55 jointly serve as ball rotation detecting means 56.

The robot manipulator S2 has a pair of shoes 57 (only one shown) for being worn by the respective feet of the operator OP seated on the seat assembly 14. For manipulating the robot R, the operator OP wears the shoes 57 while placing the feet on an upper portion of the ball 47 which is exposed on the rotary base 50. A landing sensor 58 (foot landing/lifting detecting means) comprising a contact switch or the like is mounted on the sole of each of the shoes 57. The landing sensor 58 produces an ON/OFF signal depending on whether the shoe 57 worn by the foot of the operator OP is landed on the ball 47 or lifted off the ball 47.

Figure 9:
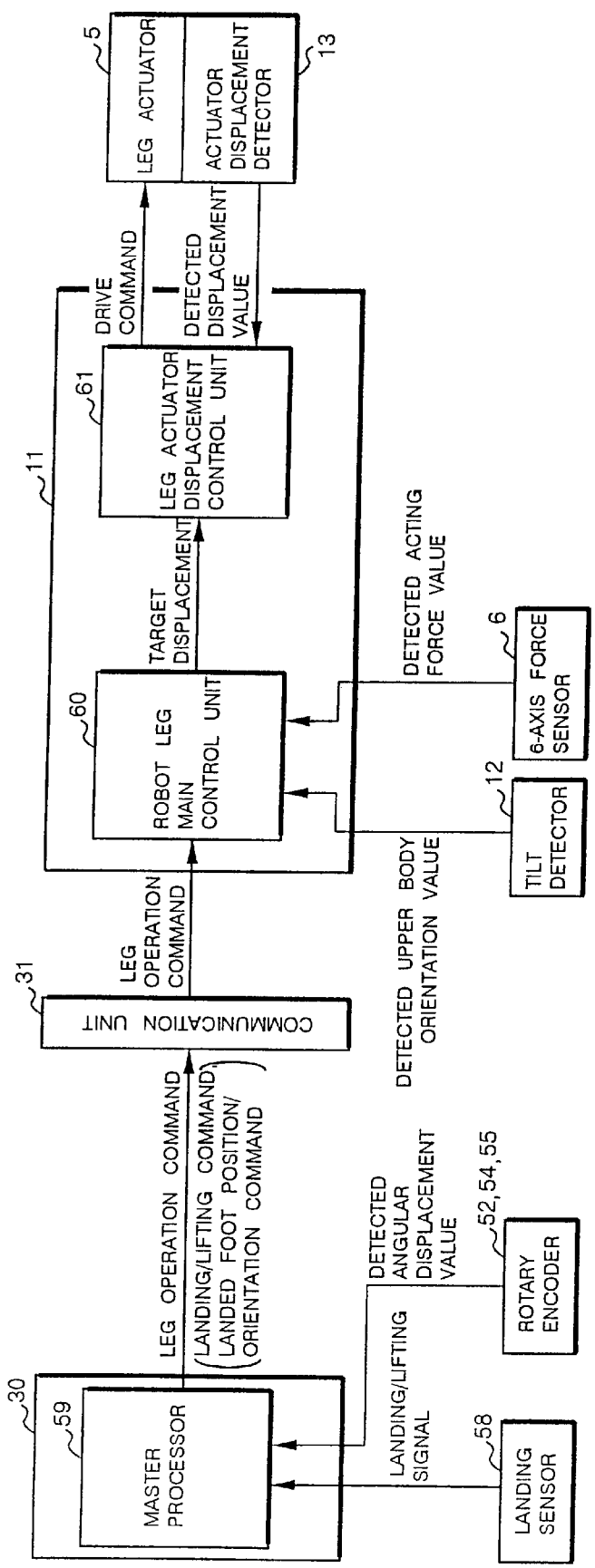
FIG. 9 is a block diagram of a control system of the remote control system according to the second embodiment of the present invention.

The remote control system according to the second embodiment includes a control system shown in FIG. 9 for controlling operation of the robot R and the robot manipulator S2.

As shown in FIG. 9, the remote control system includes a master control unit 30 disposed in the robot manipulator S2, a robot control unit 11 disposed in the robot R, and a communication unit 31 for effecting communications between the master control unit 30 and the robot control unit 11.

The master control unit 30 has a master processor 59 for supplying operation commands for the legs 3 of the robot R to the robot control unit 11. The master processor 59 is supplied with detected signals (ON/OFF signals indicating that the shoes 57 are landed on or lifted from the ball 47) from the landing sensors 58 of the shoes 57 and angular displacements of the ball 47 which are detected by the rotary encoders 52, 54, 55.

The master processor 59 serves as leg operation commanding means for generating command data (landing/lifting command) which determines times to land the legs 3 on the floor and lift the legs 3 off the floor, based on detected signals from the landing sensors 58, generating command data (landed foot position/orientation command) which determines a position/orientation for the foot of the swinging leg 3 to be landed, based on angular displacements of the ball 47 which are detected by the rotary encoders 52, 54, 55, and supplying the generated command data as leg operation commands for the robot R through the communication unit 31 to the robot control unit 11.

The master control unit 30 also has a control unit (not shown) for controlling operation of the seat assembly 14. The control unit supplies an upper body orientation command (command data which determines an angle of tilt of the upper body of the robot R) for tilting the upper body of the robot R depending on the tilted orientation of the seatback 14b of the seat assembly 14, to the robot control unit 11. Details of the control unit disclosed in Japanese patent application No. 8-343922 and the corresponding U.S. patent application Ser. No. 08/998,235 which is incorporated by this reference, and will not be described below.

The robot control unit 11 comprises a robot leg main control unit 60 and a leg actuator displacement control unit 61 for controlling operation of the leg actuators 5 of the robot R.

The robot leg main control unit 60 has the same functions as the robot leg main control unit 41 in the remote control system according to the first embodiment. The robot leg main control unit 60 determines target displacements for the leg actuators 5 of the robot based on leg operation commands (a landing/lifting command and a landed foot position/orientation command) from the master control unit 30, an upper body orientation command depending on the tilt of the seatback 14b, an orientation (tilt) of the upper body (torso 2) of the robot R as detected by the tilt detector 12, and acting forces applied from the floor to the feet 7 of the robot R as detected by the six-axis force sensors 6, and transmits the determined target displacements to the leg actuator displacement control unit 61.

The leg actuator displacement control unit 61 controls the displacements of the leg actuators 5 into the target displacements based on the target displacements transmitted from the robot leg main control unit 60 and displacements of the leg actuators 5 as detected by the actuator displacement detectors 13.

Operation of the remote control system according to the second embodiment will be described below.

Figure 10:
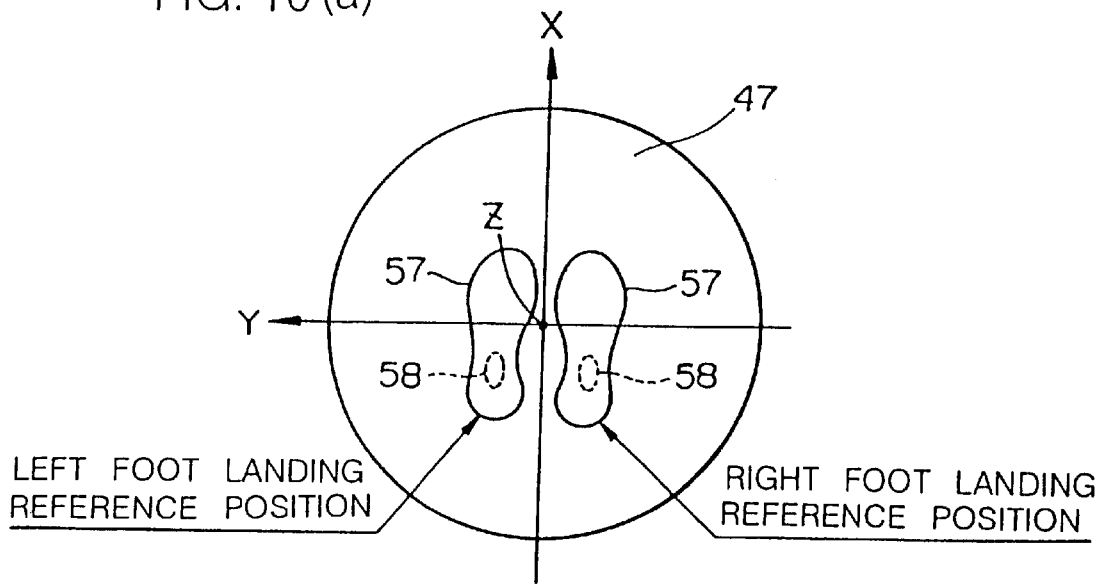
FIGS. 10($a$) and 10($b$) are diagrams illustrating the manner in which the robot manipulator shown in FIG. 7 and the remote control system shown in FIG. 9 operate.
Figure 10:
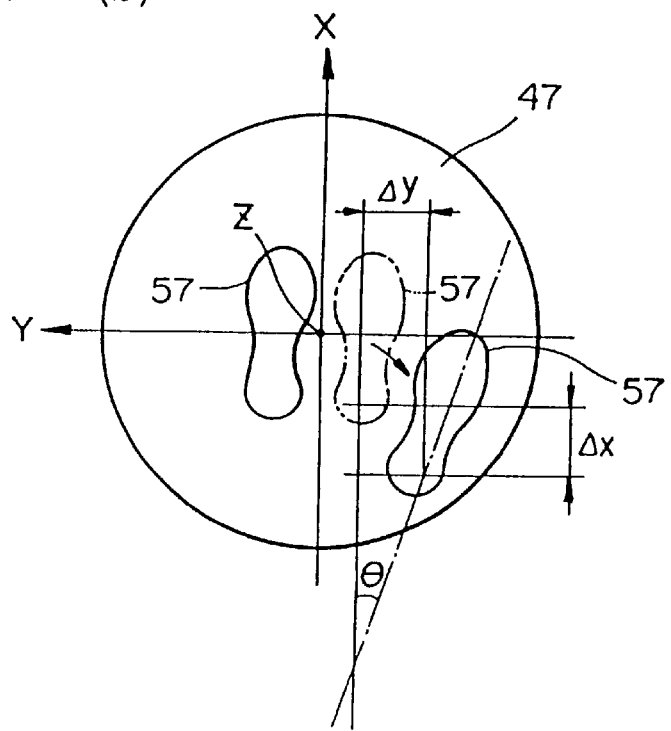

When the operator OP seated on the seat assembly 14 places the shoes 57 worn by the feet of the operator OP on the ball 47, the operator OP directs the shoes 57 longitudinally along its sagittal plane in a predetermined position at the center of the upper portion (near the top of the ball 47) of the ball 47 as shown in FIG. 10(*a*). A predetermined position for the shoe 57 on the right foot (hereinafter referred to as a "right foot landing reference position") is a right-hand position at the center of the upper portion of the ball 47, and a predetermined position for the shoe 57 on the left foot (hereinafter referred to as a "left foot landing reference position") is a left-hand position at the center of the upper portion of the ball 47.

For moving the robot R based on movement of the legs 3 thereof, the operator OP lifts the foot of one leg (swinging leg) to lift the corresponding shoe 57 off the ball 47, in the same manner as the operator OP normally moves. Then, the operator OP lowers the lifted foot toward the ball 47, and lands the shoe 57 on the ball 47 at the landing reference position thereon. Accordingly, the operator OP lifts and lands the foot of the swinging leg. With respect to the foot of the other leg (supporting leg), the operator OP moves the foot while keeping its shoe 57 in contact with the ball 47, for thereby rotating the ball 47, such that a relative positional relationship or orientational relationship between the foot of the swinging leg and the foot of the supporting leg in landing the shoe 57 of the foot of the swinging leg on the ball 47 at the landing reference position will be the same as a relative positional relationship or orientational relationship between the feet when the foot of the swinging leg is landed if the operator OP actually moves in the pattern in which the operator OP wants the robot R to move.

Specifically, if the left leg 3 of the robot R is to be advanced one step forward to walk the robot R forward, then the operator OP lifts the left foot off the ball 47 and then lowers the lifted left foot onto the ball 47 at the left foot landing reference position thereon. While the left foot is being lifted off the ball 47, the operator OP keeps the shoe 57 of the right foot in contact with the ball 47 and moves the right foot to the position shown in FIG. 10(*b*), i.e., toward the seat assembly 14, for thereby rotating the ball 47. That is, the operator OP moves the foot with its shoe 57 held against the ball 47 thereby to rotate the ball 47 in the same manner as the foot of the supporting leg moves backward with respect to the foot of the swinging leg when the operator OP actually walks. The distance by which the foot contacting the ball 47 moves from the landing reference position corresponds to the stride in the moving pattern (walking pattern) of the robot R. As the stride is greater, the distance by which the foot contacting the ball 47 moves is greater, i.e., the angular displacement of the ball 47 is greater.

If the foot 7 of the swinging leg 3 of the robot R is to be landed obliquely with respect to the foot 7 of the supporting leg 3 thereby to change the direction of movement of the robot R when the robot R is walking forward, then the operator OP moves the foot with its shoe 57 held in contact with the ball 47 for thereby rotating the ball 47, while matching a relative orientational relationship between the feet 7 when the foot 7 of the swinging leg 3 is landed on the floor. For example, if the foot 7 of the left leg 3, as the swinging leg, of the robot R is to be landed on the floor obliquely to the left with respect to the foot 7 of the right leg 3, as the supporting leg, then the foot of the right leg 3 is oriented obliquely to the right with respect to the foot 7 of the left leg 3. Therefore, when the shoe 57 of the left foot of the operator OP is landed on the ball 47 at the left foot landing reference position thereon, the operator OP rotates the ball 47 with movement of the right foot so that the shoe 57 of the right foot is oriented obliquely to the right. At this time, the ball 47 is rotated about the Z-axis.

The operator OP moves its feet in the same manner as described above when the operator OP moves the robot R backward. If the robot R is to keep stepping, then the operator OP moves the feet alternately up and down at the landing reference positions on the ball 47.

While the operator OP is moving the feet to rotate the ball 47 in the pattern in which the operator OP wants the robot R to move, the landing of the feet on the ball 47 and the lifting of the feet off the ball 47 are detected by the landing sensors 58 of the shoes 57, and indicated to the master processor 59 of the master control unit 30.

At this time, the master processor 59 determines the leg 3 of the robot R corresponding to the foot of the operator OP whose lifting from the ball 47 is detected by the landing sensor 58, as the leg 3 to be lifted off the floor, generates a lifting/landing command for the leg 3 depending on the detected lifting of the foot of the operator OP from the ball 47 and the subsequent detected landing of the foot on the ball 47, and transmits the generated lifting/landing command through the communication unit 31 to the robot control unit 11.

Figure 11:
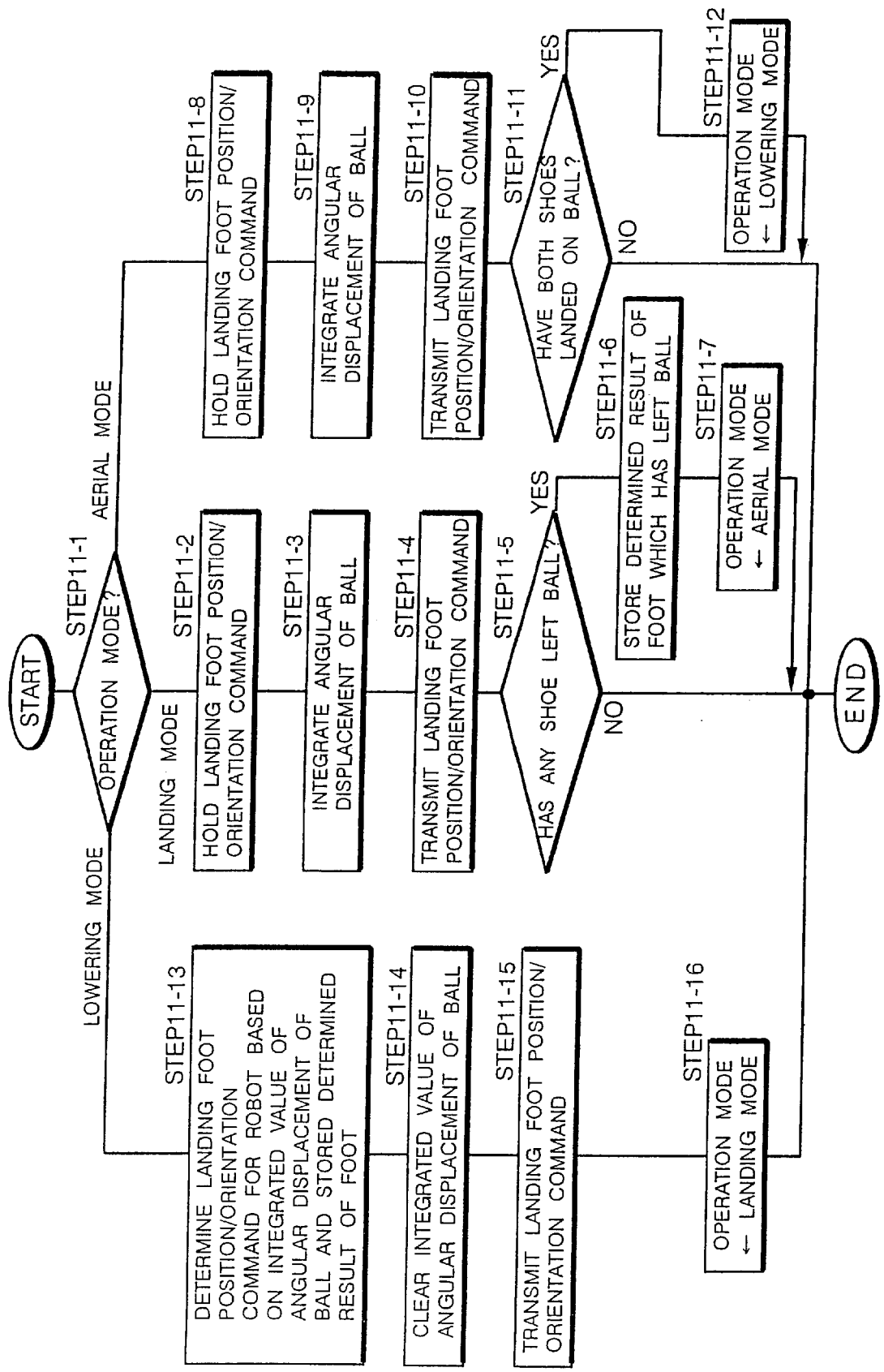
FIG. 11 is a flowchart of an operation sequence of the remote control system shown in FIG. 9.

The master processor 59 carries out an operation sequence shown in FIG. 11 in predetermined control cycles.

First, the master processor 59 determines an operation mode of the feet of the operator OP in STEP11-1. As with the first embodiment, operation modes include a landing mode, an aerial mode, and a lowering mode. The landing mode is a mode in which the operator OP keeps the feet wearing the shoes 57 in contact with the ball 47. The aerial mode is a mode in which the operator OP lifts one of the feet to hold the shoe 57 away from the ball 47. The lowering mode is a mode in which the operator OP lowers the shoe 57 of the lifted foot onto the ball 47. When the robot R starts being manipulated, the operator OP keeps the shoes 57 of the feet on the ball 47 as shown in FIG. 10(*a*). Therefore, the initial operation mode of the feet of the operator OP is the landing mode.

If the operation mode is the landing mode, then the master processor 59 holds the landed foot position/orientation command as it is in STEP11-2, and integrates angular displacements (rotational angles) of the ball 47 about the X-, Y-, and Z-axes as detected by the rotary encoders 52, 54, 55 in STEP11-3.

Rotational angles of the ball 47 in the landing mode in which the feet of the operator OP are held in contact with the ball 47 are integrated for the following reasons: In this embodiment, when the feet of the operator OP are landed on the ball 47, the feet are basically oriented longitudinally along the sagittal plane of the operator OP in the landing reference position as shown in FIG. 10(*a*). Depending on the distance by and the direction in which the landed foot (corresponding to the supporting leg 3 of the robot R) moves from the landing reference position, a landed position and an orientation for the foot 7 of the swinging leg 3 with respect to the foot 7 of the supporting leg 3 is commanded to the robot R (the landed foot position/orientation). Therefore, while the operator OP is holding the shoes 57 of the feet in contact with the ball 47, if the operator OP inadvertently moved the feet to rotate the ball 47 and thereafter lifted one of the feet and rotated the ball 47 with the other landed foot, then the rotational angle by which the ball 47 would be rotated by the landed foot after the lifting of the foot until the landing of the lifted foot onto the ball 47 at the landing reference position, would fail to provide a proper recognition of the distance by and the direction in which the landed foot would be moved from the landing reference position. To avoid such a shortcoming, the rotational angles of the ball 47 about the X-, Y-, and Z-axes in the landing mode are integrated in STEP11-3.

If, when the operator OP lifts one of the feet off the ball 47, the operator recognizes the position and orientation of the other foot, and adjusts the distance by and the direction in which the foot held in contact with the ball 47 is moved, then STEP11-3 may be dispensed with.

Then, the master processor 59 transmits the landed foot position/orientation command held in STEP11-2 through the communication unit 31 to the robot control unit 11 in STEP11-4, and decides whether any shoe 57 has been lifted off the ball 47 based on detected signals from the landing sensors 58 of the shoes 57 in STEP11-5. If both shoes 57 are landed on the ball 47 (NO in STEP11-5), then the present control cycle in the landing mode is finished. If any shoe 57 has been lifted off the ball 47 (YES in STEP11-5), then the master processor 59 stores a determined result indicating the left or right foot lifted off the ball 47 (recognized by the landing sensor 58 of the left or right shoe 57) in a memory (not shown) in STEP11-6. The master processor 59 changes the operation mode to the aerial mode in STEP11-7, after which the present control cycle in the landing mode is finished.

If the operation mode is the aerial mode in STEP11-1 (the operation mode is the aerial mode in a next control cycle after STEP11-7 in the landing mode), then the master processor 59 holds the landed foot position/orientation command as it is in STEP11-8, and integrates angular displacements (rotational angles) of the ball 47 about the X-, Y-, and Z-axes as detected by the rotary encoders 52, 54, 55 in STEP11-9. The integration is continuously effected from the landing mode.

The master processor 59 transmits the landed foot position/orientation command held in STEP11-8 through the communication unit 31 to the robot control unit 11 in STEP11-10, and decides whether the shoes 57 of both feet have been landed on the ball 47 based on detected signals from the landing sensors 58 of the shoes 57 in STEP11-11. If the shoes 57 of both feet have not been landed on the ball 47 (NO in STEP11-11), i.e., if the lifted foot has not been landed on the ball 47, then the present control cycle is finished. If the shoes 57 have been landed on the ball 47 (YES in STEP11-11), i.e., if the lifted foot has been landed on the ball 47, then the master processor 59 changes the operation mode to the lowering mode in STEP11-12, after which the present control cycle in the aerial mode is finished.

If the operation mode is the lowering mode in STEP11-1 (the operation mode is the lowering mode in a next control cycle after STEP11-12 in the aerial mode), then the master processor 59 determines in STEP11-13 a landed foot position/orientation command for the foot 7 of the swinging leg 3 of the robot R with respect to the foot 7 of the supporting leg 3 based on integrated values of the rotational angles of the ball 47 about the X-, Y-, and Z-axes which have been determined in STEP11-3, STEP11-9 in the landing and aerial modes and the determined result stored in STEP11-16.

More specifically, if the ball 47 is rotated as shown in FIG. 10(b) (the operator OP lifts the left foot and rotates the ball 47 with the right foot toward the seat assembly 14), for example, then the determined result stored in STEP11-6 indicates the left foot (the left foot of the operator OP is lifted off the ball 47 in the landing mode). At this time, the master processor 59 calculates a distance $\Delta x$ ($\Delta x<0$ in FIG. 10(b)) by which the right foot of the operator OP has moved from the right foot landing reference position in the direction of the X-axis (in the sagittal direction) and a distance $\Delta y$ ($\Delta y<0$ in FIG. 10(b)) by which the right foot of the operator OP has moved from the right foot landing reference position in the direction of the Y-axis (in the lateral direction), from integrated values of the rotational angles of the ball 47 about the X- and Y-axes according to predetermined formulas. The master processor 59 also obtains an integrated value of rotational angles of the ball 47 about the Z-axis as a rotational angle $\Delta\theta$ ($\Delta\theta<0$ in FIG. 10(b)) of the right foot of the operator OP from the right foot landing reference position about the Z-axis (the vertical axis).

The master processor 59 then determines a landed foot position/orientation command for the foot 7 of the swinging leg 3 (the left leg 3 in FIG. 10(b)) of the robot R with respect to the foot 7 of the supporting leg 3 (the right leg 3 in FIG. 10(b)) from the distances $\Delta x$, $\Delta y$ and the rotational angle $\Delta\theta$, as follows: A landed position in the sagittal direction (the X-axis direction) for the foot 7 of the swinging leg 3 of the robot R is determined as a position that is spaced forward from the foot 7 of the supporting leg 3 by a value $-k1\cdot\Delta x$ which is the product of the distance $\Delta x$ and a predetermined negative gain constant ($-k1$). A landed position in the lateral direction (the Y-axis direction) for the foot 7 of the swinging leg 3 of the robot R is determined as a position that is spaced leftward from the foot 7 of the supporting leg 3 by a value ($-k2\cdot\Delta y+a$) which is the sum of a predetermined offset value a and the product of the distance $\Delta y$ and a predetermined negative gain constant ($-k2$). The offset value a defines the lateral distance between the feet 7 of the robot R when $\Delta y=0$ (e.g., when the robot R walks straight). A landed orientation for the foot 7 of the swinging leg 3 of the robot R is determined as an orientation that is angularly displaced leftward about the vertical axis from the orientation of the foot 7 of the supporting leg 3 by a value $-k3\cdot\Delta\theta$ which is the product of the rotational angle $\Delta\theta$ about the Z-axis and a predetermined negative gain constant ($-k3$).

The master processor 59 determines a landed foot position/orientation command similarly when the operator OP lifts the right foot and rotates the ball 47 with the left foot. In this case, the master processor 59 determines a landed foot position/orientation command for the foot 7 of the right leg 3 with respect to the foot 7 of the left leg 3.

The landed foot position/orientation command thus determined corresponds to a relative position/orientation relationship between the feet when the operator OP lands the lifted foot on the ball 47 at the landing reference position.

In this embodiment, the landed foot position/orientation command for the foot 7 of the swinging leg 3 is determined in a coordinate system of the foot 7 of the swinging leg 3. However, the determined landed foot position/orientation command may be converted into a command in a coordinate system of the foot 7 of the supporting leg 3, and the converted command may be given to the robot R.

Referring back to FIG. 11, the master processor 59 clears the integrated values of the rotational angles of the ball 47 about the axes, i.e., resets the integrated values to "0" in STEP11-14, and then transmits the landed foot position/orientation command determined in STEP11-13 through the communication unit 31 to the robot control unit 11 in STEP11-15. The master processor 59 changes the operation mode to the landing mode in STEP11-16, after which the present control cycle in the landing mode is finished.

When the robot manipulator S2 operates and effects the control processing as described above, the robot leg main control unit 60 of the robot control unit 11 operates in the same manner as the robot leg main control unit 41 according to the first embodiment in predetermined control cycles.

An operation sequence of the robot leg main control unit 60 will be described below with reference to FIG. 12.

The robot leg main control unit 60 reads output signals from various sensors including the tilt detector 12 and the six-axis force sensor 6 in STEP12-1, and then receives leg operation commands (a landing/lifting command and a landed foot position/orientation command) supplied through the communication unit 31 from the master control unit 30 and an upper body orientation command based on tilting movement of the seatback 14b of the seat assembly 14 in STEP12-2.

The robot leg main control unit 60 decides whether there is a landing request for either one of the legs 3 or not based on the landing/lifting command in STEP12-3. If there is a landing request, then the robot leg main control unit 60 generates a basic target gait for the robot R according to the landed foot position/orientation command and the upper body orientation command, for one step of the leg 3 for which the landing request has been received in STEP12-4. A target foot position/orientation for the swinging leg 3 at the target gait when the swinging leg 3 is landed is generated according to the landed foot position/orientation command.

Then, the robot leg main control unit 60 calculates an instantaneous value of the target gait in the present control cycle from the generated basic target gait in STEP12-5, and effects a control process for stabilizing the orientation of the robot R, i.e., an orientation stabilizing control process based on a compliance control process, to correct the calculated instantaneous value of the target gait in STEP12-6.

The robot leg main control unit 60 calculates a target displacement of each of the leg actuators 5 of each leg 3 in the present control cycle, corresponding to the instantaneous value, from the corrected instantaneous value of the target gait in STEP12-7, and sends the calculated target displacement as a command to the leg actuator displacement control unit 61 in STEP12-8. At this time, the leg actuator displacement control unit 61 controls each of the leg actuators 5 to be displaced by the calculated target displacement according to the supplied command through a feedback control loop.

Thereafter, the robot leg main control unit 60 transmits operation information of the robot R necessary to tilt the seat base 14a of the seat assembly 14 through the communication unit 31 to the master control unit 30 in STEP12-9, whereupon the present control cycle is finished. At this time, it is not required to transmit operation information (including position/orientation information of the feet 7) of the legs 34 of the robot R from the robot control unit 11 to the master control unit 30.

The above operation of the robot R enables the robot R to automatically stabilize its own orientation while the robot R is walking in substantially the same pattern as the feet of the operator OP. At this time, the movement of the legs 3 of the robot R is one step delayed with respect to the movement of the feet of the operator OP.

With the above remote control system, since the stride of the robot R and the direction of movement thereof are determined by the distance by and the direction in which the foot of the supporting leg (the foot held in contact with the ball 47) of the operator OP is moved with respect to the foot of the swinging leg thereof when the feet of the operator are landed on and lifted off the ball 47, the operator OP can perceptively recognize the movement of its own feet as the movement of the legs 3 of the robot R, and hence can move the legs 3 of the robot R reliably as desired. Because the operator OP can move the robot R by moving the feet while seated on the seat assembly 14, the operator OP can move the robot R in a wide range without the need for a substantial facility on the robot manipulator S2.

In the second embodiment, rotational angles of the ball 47 for determining a landed foot position/orientation command for the robot R are determined by the rotary encoders 52, 54, 55. However, rotational speeds of the ball 47 about the respective axes may be detected by contactless speed sensors, and integrated to determine rotational angles of the ball 47 about the respective axes.

In this embodiment, the landing sensors 58 of the shoes 57 detect when the feet of the operator OP are landed on and lifted off the ball 47. However, load sensors, optical sensors, or electromagnetic sensors may be employed to detect when the feet of the operator OP are landed on and lifted off the ball 47.

Operation information of the legs 3 of the robot R may be transmitted from the robot control unit 11 to the master control unit 14, and rotation of the ball 47 and the determined landed foot position/orientation command may be limited depending on the transmitted operation information in order to prevent the legs 3 of the robot R from moving excessively. For limiting the rotation of the ball 47, actuators (motors) or brakes may be disposed coaxially with the rotary encoders 52, 54, 55, for example.

A remote control system according to a third embodiment of the present invention will be described below with reference to FIGS. 1 and 13 through 16.

The remote control system according to the third embodiment serves to remotely control the biped locomotion robot R shown in FIG. 1.

Figure 13:
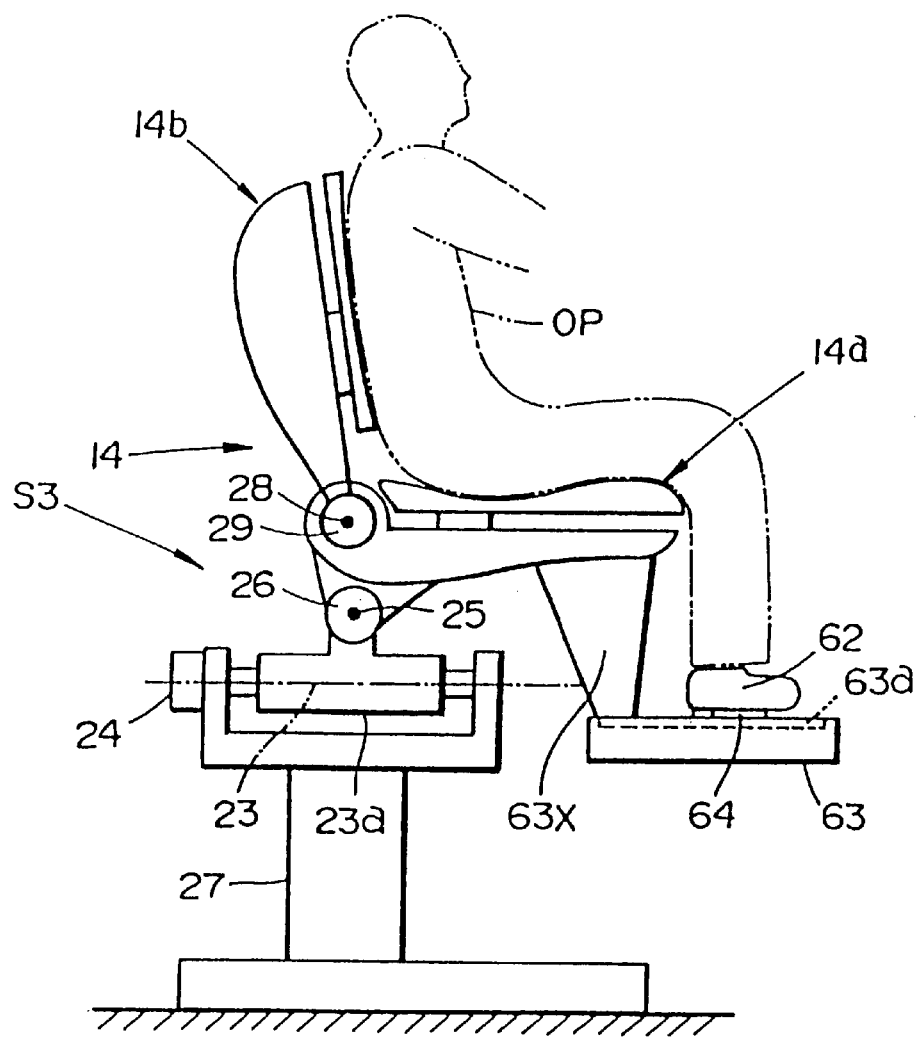
FIG. 13 is a schematic side elevational view of a robot manipulator of a remote control system according to a third embodiment of the present invention.
Figure 14:
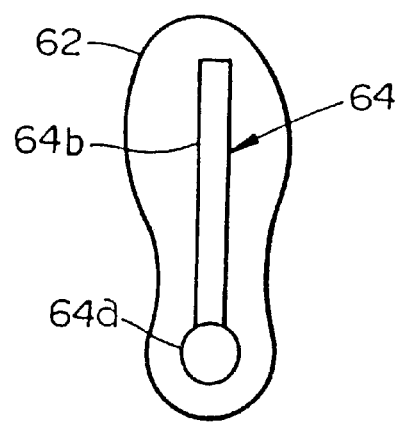
FIG. 14 is a plan view of the sole of a shoe used in the robot manipulator shown in FIG. 13.

FIG. 13 shows a robot manipulator S3 for manipulating the robot R in the remote control system according to the third embodiment. As shown in FIG. 13, the robot manipulator S3 has a seat assembly 14, which is the same as the seat assembly 14 according to the first embodiment, as an upper body support mechanism for supporting the upper body of the operator OP. The robot manipulator S3 also has a flat foot support 63 for placing therein shoes 63 worn by the feet of the operator OP seated on the seat assembly 14. The foot support 63 is fixed to the seat base 14a by a bracket 63x. As shown in FIG. 14, each of the shoes 62 has a ridge 64 mounted longitudinally on the sole thereof. The ridge 64 comprises a circular portion 64a positioned at the heel and an elongate portion 64b extending from the circular portion 64a longitudinally toward the toe. The ridges 64 are made of a material which can slide on the upper surface of the foot support 63, i.e., a material having a relatively small coefficient of friction with respect to the upper surface of the foot support 63. The portion 64a may be rectangular or triangular in shape, rather than circular in shape.

The upper surface of the foot support 63 comprises a distributed contact sensor 63a having a matrix of contact sensor elements (not shown) for detecting an object which is brought into contact therewith. When an object contacts the distributed contact sensor 63a, the distributed contact sensor 63a produces output data representative of the position and shape of the object.

Figure 15:
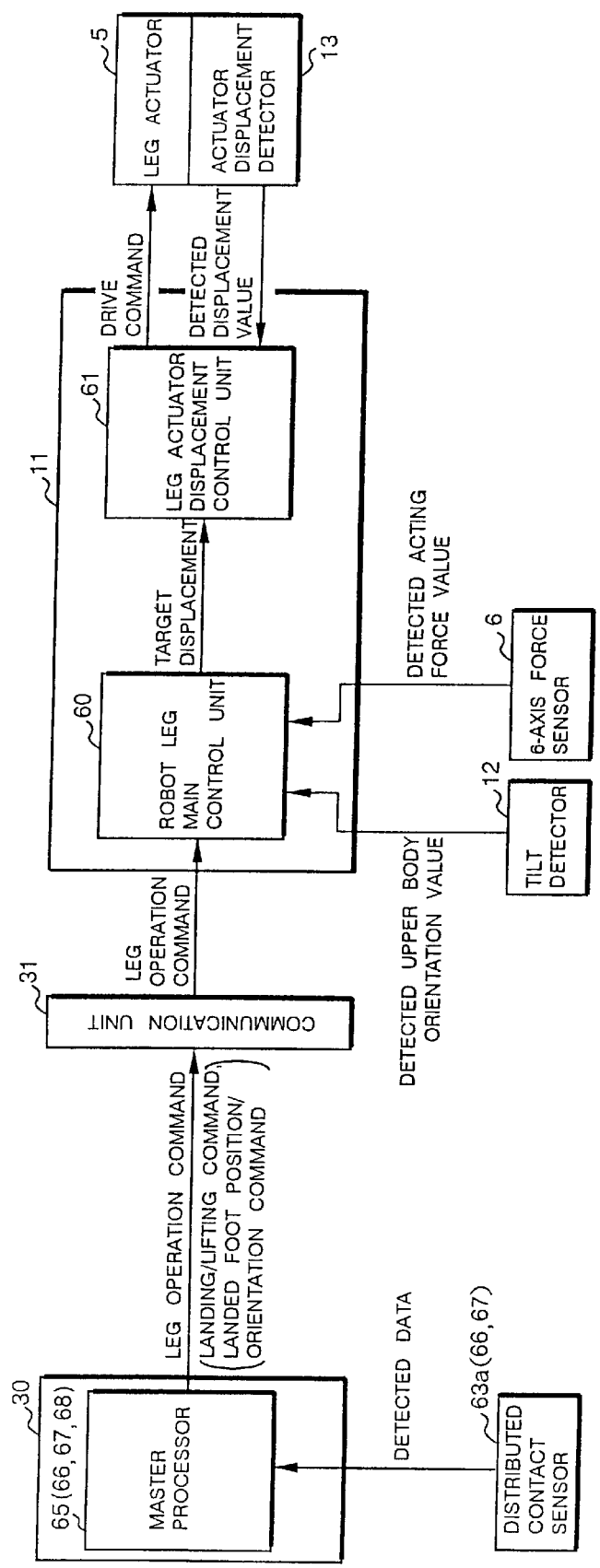
FIG. 15 is a block diagram of a control system of the remote control system according to the third embodiment of the present invention.

The remote control system according to the third embodiment includes a control system shown in FIG. 15 for controlling operation of the robot R and the robot manipulator S3.

As shown in FIG. 15, the remote control system includes a master control unit 30 disposed in the robot manipulator S3, a robot control unit 11 disposed in the robot R, and a communication unit 31 for effecting communications between the master control unit 30 and the robot control unit 11. The master control unit 30 has a master processor 65 which is supplied with detected data from the distributed contact sensor 63a.

The master processor 65 and the distributed contact sensor 63a jointly function as foot landing/lifting detecting means 66 for recognizing the landing of each of the feet of the operator OP on the foot support 63 and the lifting of each of the feet of the operator OP off the foot support 63, based on whether the ridge 64 of the shoe 62 worn by each of the feet of the operator OP is detected by the distributed contact sensor 63a or not. For example, if the distributed contact sensor 63a detects two ridges 64 on the foot support 63, then the landing of the feet of the operator OP on the foot support 63 is recognized. If the distributed contact sensor 63a subsequently does not detect the right ridge 64, then the lifting of the right foot from the foot support 63 is recognized. The left and right feet of the operator OP as they are landed on and lifted off the foot support 63 may be distinguished on the basis of different shapes or sizes of the ridges 64 which can be detected differently by the distributed contact sensor 63a.

The master processor 65 and the distributed contact sensor 63a also jointly function as foot position/orientation detecting means 67 for detecting a relative position/orientation between the feet of the operator OP when the feet are landed on the foot support 63. Specifically, the master processor 65 recognizes the positions (in a plane coordinate system fixed to the foot support 63) of the circular portions 64a of the ridges 64 on the foot support 63 from output data from the distributed contact sensor 63a. The master processor 65 then recognizes the position of one of the circular portions 64a with respect to the position of the other circular portion 64a, as a relative position/orientation between the feet, from the recognized positions of the circular portions 64a. The master processor 65 as the foot position/orientation detecting means 67 also recognizes orientations of the elongate portions 64b of the ridges 64 on the foot support 63 from output data from the distributed contact sensor 63a. Based on the recognized orientations of the elongate portions 64b, the master processor 65 recognizes the orientation of one of the elongate portions 64b with respect to the orientation of the other elongate portion 64b as a relative orientation between the feet of the operator OP.

Figure 16:
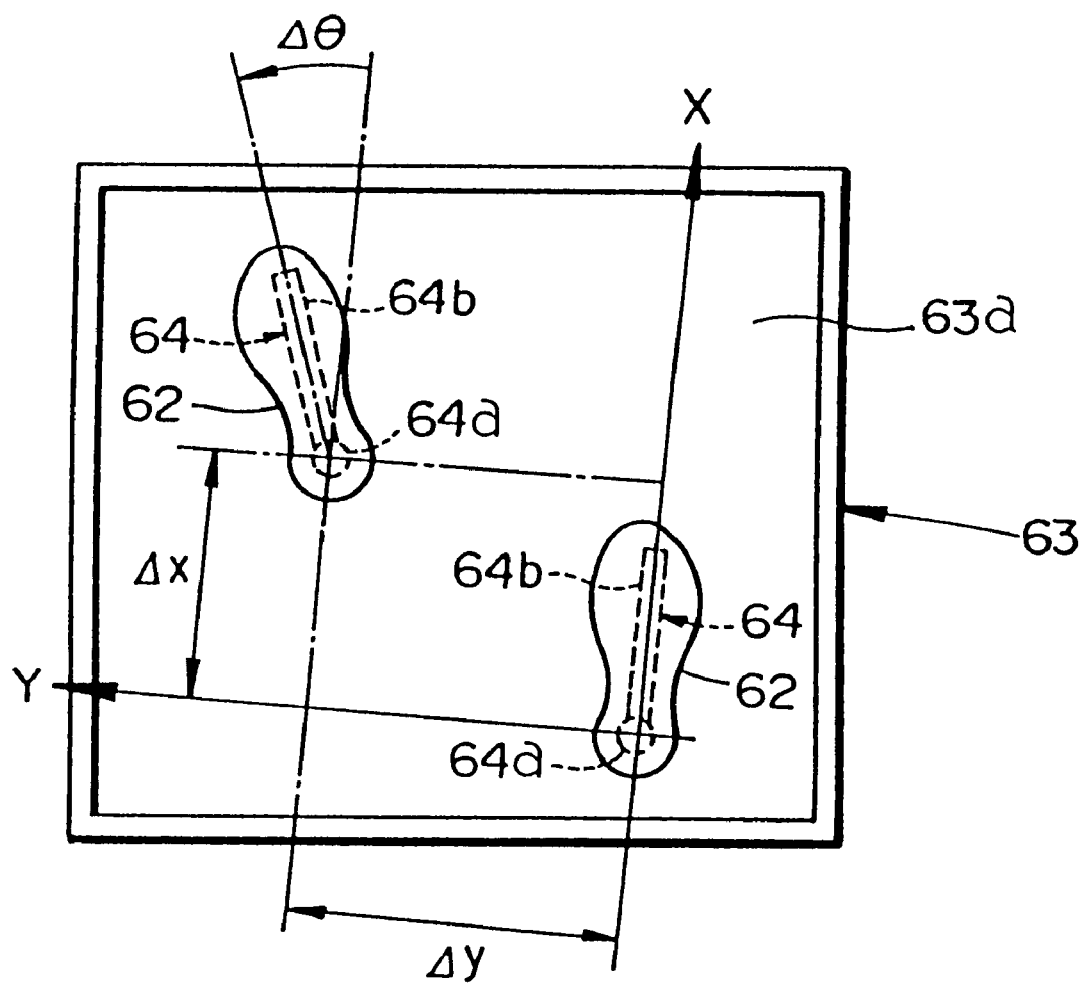
FIG. 16 is a diagram illustrating the manner in which the robot manipulator shown in FIG. 13 and the remote control system shown in FIG. 15 operate.

More specifically, as shown in FIG. 16, when the ridges 64 of the shoes 62 are landed on the foot support 63, the master processor 65 as the foot position/orientation detecting means 67 recognizes displacements $\Delta x$, $\Delta y$ of the circular portion 64a of the ridge 64 of the left foot from the circular portion 64a of the ridge 64 of the right foot respectively in the longitudinal direction (the X-axis direction in FIG. 16) of the elongate portion 64b of the ridge 64 of the right foot and the direction (the Y-axis direction in FIG. 16) perpendicular to the longitudinal direction, as indicating a relative position of the feet. The master processor 65 as the foot position/orientation detecting means 67 also recognizes an azimuth angle $\Delta\theta$ of the elongate portion 64b of the ridge 64 of the left foot with respect to the orientation (the X-axis direction) of the elongate portion 64b of the ridge 64 of the right foot, as indicating a relative orientation of the feet.

The master processor 65 also functions as leg operation commanding means 68 for determining a landing/lifting command and a landed foot position/orientation command as described above with respect to the second embodiment, based on the landing of the feet of the operator OP on the foot support 63 and the lifting of the feet of the operator OP from the foot support 63 as recognized by the foot landing/lifting detecting means 66, and the relative position/orientation of the feet of the operator OP as recognized by the foot position/orientation detecting means 67, as described in detail later on, and transmits the determined commands as leg operation commands through the communication unit 31 to the robot control unit 11.

Other details of the remote control system according to the third embodiment are identical to those of the remote control system according to the second embodiment.

Operation of the remote control system according to the third embodiment will be described below.

For the operator OP to move the robot R by moving the legs 3 of the robot R, the operator OP lifts the foot of the swinging leg to lift the shoe 62 worn by the foot off the foot support 63. The operator OP moves the foot of the swinging leg in a direction in which the foot 7 of the swinging leg 3 of the robot R is to be moved, and moves the shoe 62 worn by the foot of the supporting leg in sliding contact with the foot support 63 in the direction opposite to the direction in which the foot of the swinging leg is moved. Finally, the operator OP lowers the lifted foot onto the foot support 63, and moves the feet such that a relative position/orientation relationship between the feet of the operator OP will be the same as a relative position/orientation relationship between the feet 7 when the swinging leg 3 is landed in the pattern in which the operator OP wants the legs 3 of the robot R to be moved.

For example, if the left leg 3 of the robot R is to be advanced one step forward to walk the robot R forward, then the operator OP lifts the left foot off the foot support 63 and then moves the lifted left foot forward. At the same time, the operator OP slides the shoe 62 of the right foot backward (toward the seat assembly 14) while keeping it in contact with the foot support 63. Then, as shown in FIG. 16, the operator OP lowers the left foot onto the foot support 63 to keep such a positional relationship between the feet that the distance in the sagittal direction between the feet on the foot support 63 at the time the left foot is landed on the foot support 63 will correspond to the stride of the robot R in the pattern in which the operator OP wants the robot R to walk.

If the foot 7 of the swinging leg 3 of the robot R is to be landed obliquely to the foot 7 of the supporting leg 3 to change the direction of movement of the robot R while the robot R is walking forward, the operator OP moves the feet so as to match a relative orientational relationship between the feet 7 when the foot 7 of the swinging leg 3 of the robot R is landed. For example, if the foot 7 of the left leg 3, as the swinging leg, of the robot R is to be landed on the floor obliquely to the left with respect to the foot 7 of the right leg 3, as the supporting leg, then the operator OP moves the feet such that the shoe 62 of the left foot is oriented obliquely to the left with respect to the shoe 62 of the right foot, i.e., the elongate portion 64b of the ridge 64 on the shoe 62, when placing the shoe 62 of the left foot on the foot support 63.

The operator OP moves its feet in the same manner as described above when the operator OP moves the robot R backward. If the robot R is to keep stepping, then the operator OP moves the feet alternately up and down at the same position on the foot support 63.

While the operator OP is moving the feet in the pattern in which the operator OP wants the robot R to move, the landing of the feet on the foot support 63 and the lifting of the feet off the foot support 63 are detected by the master processor 65 as the foot landing/lifting detecting means 66 based on output data from the distributed contact sensor 63a.

At this time, the master processor 65 determines the leg 3 of the robot R corresponding to the foot of the operator OP whose lifting from the foot support 63 is detected, as the leg 3 to be lifted off the floor, generates a lifting/landing command for the leg 3 depending on the detected lifting of the foot of the operator OP from the foot support 63 and the subsequent detected landing of the foot on the foot support 63, and transmits the generated lifting/landing command through the communication unit 31 to the robot control unit 11.

Figure 17:
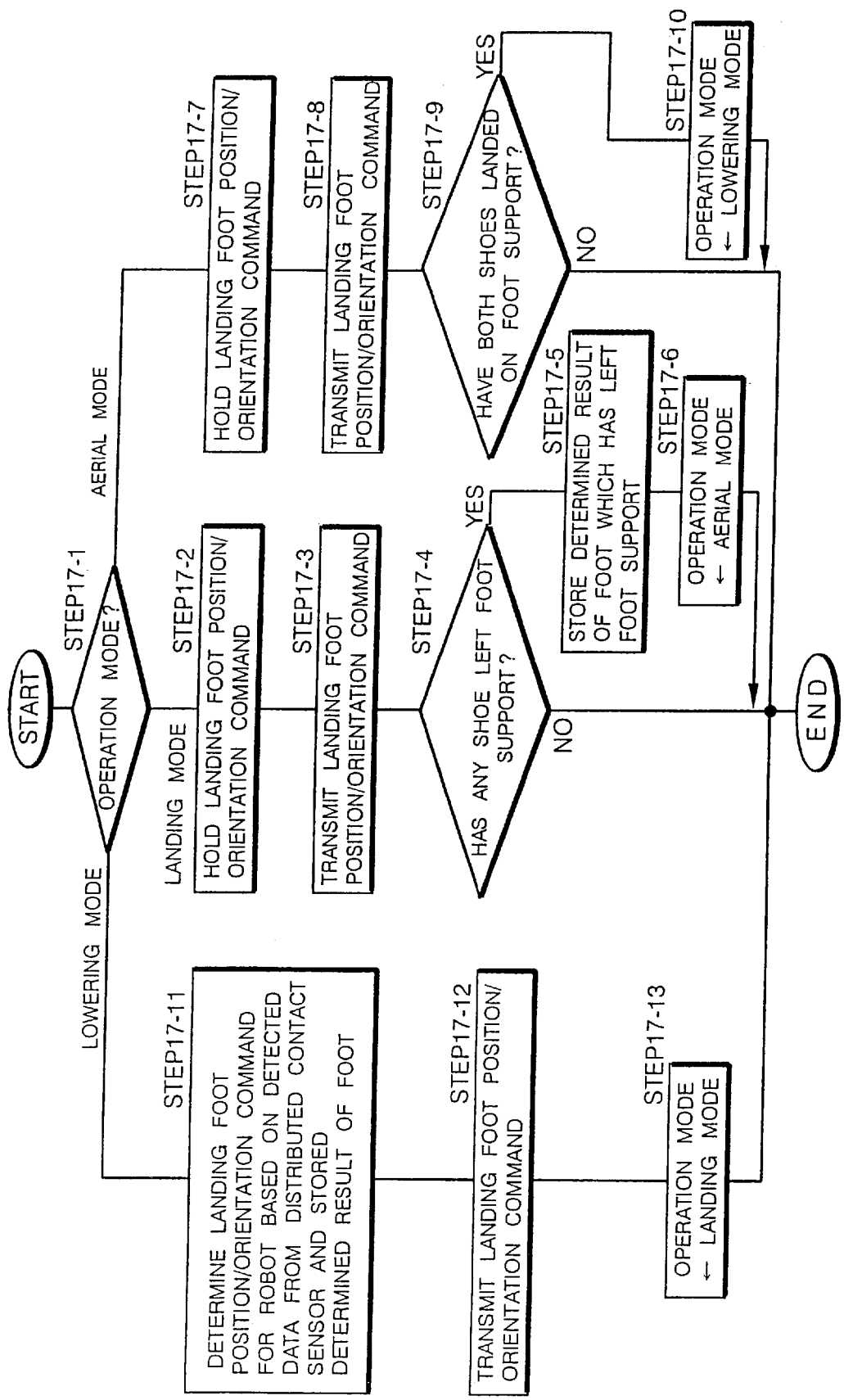
FIG. 17 is a flowchart of an operation sequence of the remote control system shown in FIG. 15.

The master processor 65 carries out an operation sequence shown in FIG. 17 in predetermined control cycles.

First, the master processor 65 determines an operation mode (a landing mode, an aerial mode, or a lowering mode) of the feet of the operator OP in STEP17-1. When the robot R starts being manipulated, the initial operation mode of the feet of the operator OP is the landing mode.

If the operation mode is the landing mode, i.e., if the shoes 62 of the feet of the operator OP are placed on the foot support 63, then the master processor 65 holds the landed foot position/orientation command as it is in STEP17-2, and transmits the landed foot position/orientation command held in STEP17-2 through the communication unit 31 to the robot control unit 11 in STEP17-3.

The master processor 65 decides whether any shoe 62 has been lifted off the foot support 63 based on the landing or lifting of each foot of the operator OP on or off the foot support 63 as recognized by the foot landing/lifting detecting means 66, in STEP17-4. If both shoes 62 are landed on the foot support 63 (NO in STEP17-4), then the present control cycle in the landing mode is finished. If any shoe 62 has been lifted off the foot support 63 (YES in STEP17-4), then the master processor 65 stores a determined result indicating the left or right foot is lifted off the foot support 63 (recognized by the foot landing/lifting detecting means 66) in a memory (not shown) in STEP17-5. The master processor 65 changes the operation mode to the aerial mode in STEP17-6, after which the present control cycle in the landing mode is finished.

If the operation mode is the aerial mode in STEP17-1 (the operation mode is the aerial mode in a next control cycle after STEP17-6), then the master processor 65 holds the landed foot position/orientation command as it is in STEP17-7, and transmits the landed foot position/ orientation command held in STEP17-7 through the communication unit 31 to the robot control unit 11 in STEP17-8. The master processor 65 decides whether the shoes 62 of both feet have been landed on the foot support 63 based on the landing or lifting of each foot of the operator OP on or off the foot support 63 as recognized by the foot landing/ lifting detecting means 66, in STEP17-9. If the shoes 62 of both feet have not been landed on the foot support 63 (NO in STEP17-9), i.e., if the lifted foot remains lifted, then the present control cycle is finished. If the shoes 62 have been landed on the foot support 63 (YES in STEP11-11), i.e., if the lifted foot has been landed on the foot support 63, then the master processor 65 changes the operation mode to the lowering mode in STEP17-10, after which the present control cycle in the landing mode is finished.

If the operation mode is the lowering mode in STEP17-1 (the operation mode is the lowering mode in a next control cycle after STEP17-10), then the master processor 65 determines in STEP17-11 a landed foot position/orientation command for the foot 7 of the swinging leg 3 of the robot R with respect to the foot 7 of the supporting leg 3 based on detected data from the distributed contact sensor 63a and the determined result stored in STEP17-5.

More specifically, if the operator OP lifts the left foot and moves the lifted left foot forward, moves the right foot backward while in contact with the foot support 63, and finally places the shoe 62 of the left foot onto the foot support 63 to achieve a position/orientation relationship between the shoes 62 of the feet as shown in FIG. 16, for example, then the determined result stored in STEP17-5 indicates the left foot (the left foot of the operator OP is lifted off the foot support 63 in the landing mode). At this time, the master processor 65 as the foot position/orientation detecting means 67 calculates a distance Δx by which the circular portion 64a of the ridge 64 of the left foot has moved from the circular portion 64a of the ridge 64 of the right foot in the longitudinal direction of the elongate portion 64b of the ridge 64 of the right foot (the X-axis direction in FIG. 16), a distance Δy by which the circular portion 64a of the ridge 64 of the left foot has moved from the circular portion 64a of the ridge 64 of the right foot in the direction (the Y-axis direction in FIG. 16) perpendicular to the longitudinal direction, and an azimuth angle Δθ of the elongate portion 64b of the ridge 64 of the left foot with respect to the longitudinal direction of the elongate portion 64b of the ridge 64 of the right foot (the X-axis direction in FIG. 16), from the output data from the distributed contact sensor 63a.

The master processor 65 as the leg operation commanding means 68 determines a landed foot position/orientation command for the foot 7 of the swinging leg 3 (the left leg 3 in FIG. 16) of the robot R with respect to the foot 7 of the supporting leg 3 (the right leg 3 in FIG. 16) from the distances Δx, Δy and the azimuth angle Δθ, as follows: A landed position in the sagittal direction (the X-axis direction) for the foot 7 of the swinging leg 3 of the robot R is determined as a position that is spaced forward from the foot 7 of the supporting leg 3 by a value ka·Δx which is the product of the distance Δx and a predetermined positive gain constant (ka). A landed position in the lateral direction (the Y-axis direction) for the foot 7 of the swinging leg 3 of the robot R is determined as a position that is spaced leftward from the foot 7 of the supporting leg 3 by a value (kb·Δy+a) which is the sum of a predetermined offset value a and the product of the distance Δy and a predetermined positive gain constant (kb). The offset value a defines the lateral distance between the feet 7 of the robot R when Δy=0 (e.g., when the robot R walks straight). A landed orientation for the foot 7 of the swinging leg 3 of the robot R is determined as an orientation that is angularly displaced leftward about the vertical axis from the orientation of the foot 7 of the supporting leg 3 by a value kc·Δθ which is the product of the azimuth angle Δθ and a predetermined positive gain constant (kc).

The master processor 65 determines a landed foot position/orientation command similarly when the operator OP lifts the right foot and moves both feet. In this case, the master processor 65 determines a landed foot position/orientation command for the foot 7 of the right leg 3 with respect to the foot 7 of the left leg 3.

The landed foot position/orientation command thus determined corresponds to a relative position/orientation relationship between the feet when the operator OP lands the lifted foot on the foot support 63.

Referring back to FIG. 17, the master processor 65 transmits the landed foot position/orientation command determined in STEP17-11 through the communication unit 31 to the robot control unit 11 in STEP17-12. The master processor 65 changes the operation mode to the landing mode in STEP17-13, after which the present control cycle in the landing mode is finished.

Figure 12:
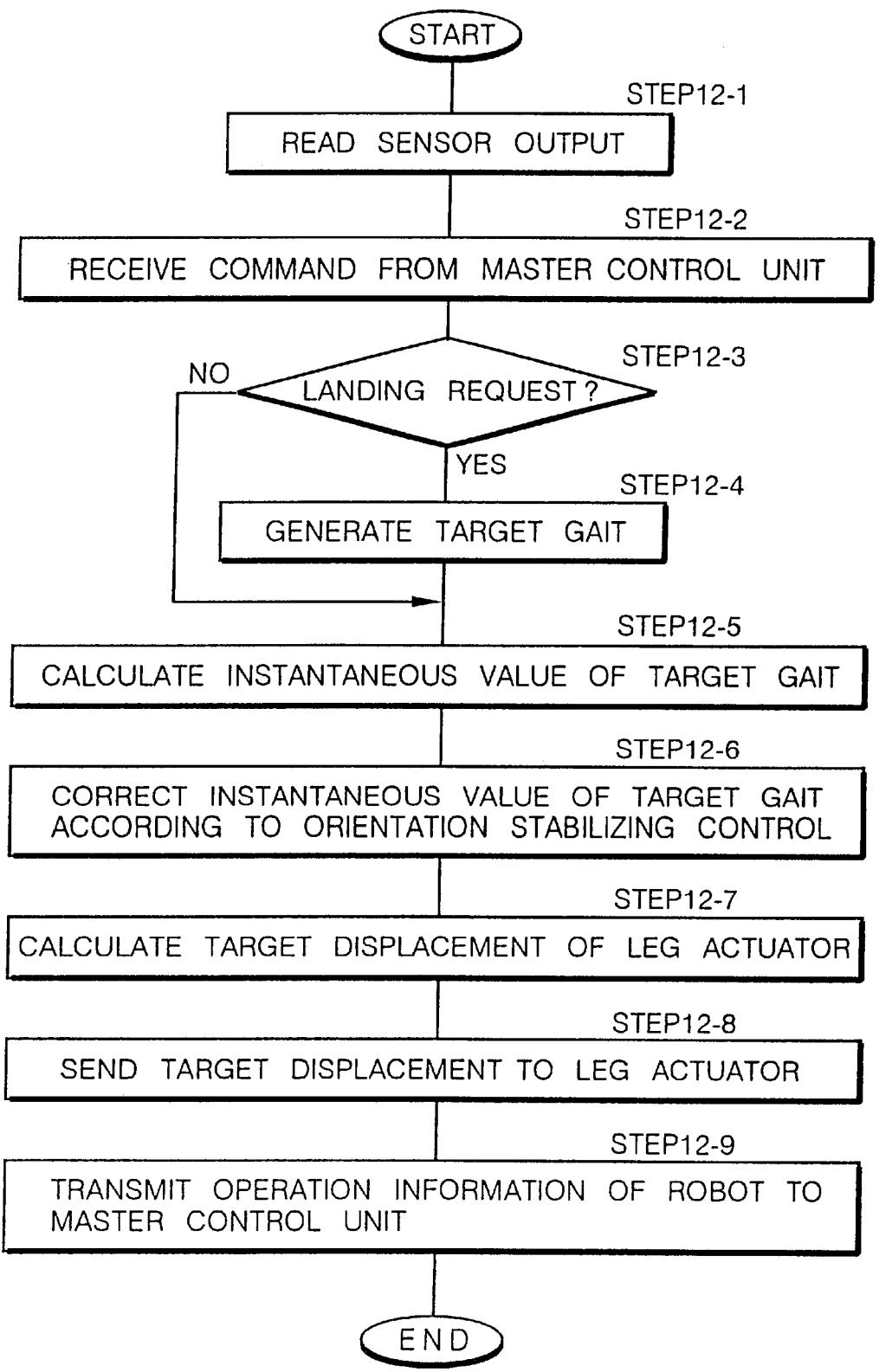
FIG. 12 is a flowchart of an operation sequence of the remote control system shown in FIG. 9.

When supplied with the lifting/landing command and the landed foot position/orientation command from the master processor 65, the robot control unit 11 operates in the same manner as the robot control unit 11 according to the second embodiment (see FIG. 12). The operation of the robot control unit 11 enables the robot R to automatically stabilize its own orientation while the robot R is walking in substantially the same pattern as the feet of the operator OP. At this time, the movement of the legs 3 of the robot R is one step delayed with respect to the movement of the feet of the operator OP.

With the above remote control system, since the stride of the robot R and the direction of movement thereof are determined by the relative position/orientation of the feet at the time the lifted foot is landed on the foot support 63 while the operator OP seated on the seat assembly 14 moves the feet vertically with respect to the foot support 63, the operator OP can perceptively recognize the movement of its own feet as the movement of the legs 3 of the robot R, and hence can move the legs 3 of the robot R reliably as desired. Because the operator OP can move the robot R by moving the feet while seated on the seat assembly 14, the operator OP can move the robot R in a wide range without the need for a substantial facility on the robot manipulator S2.

Figure 18:
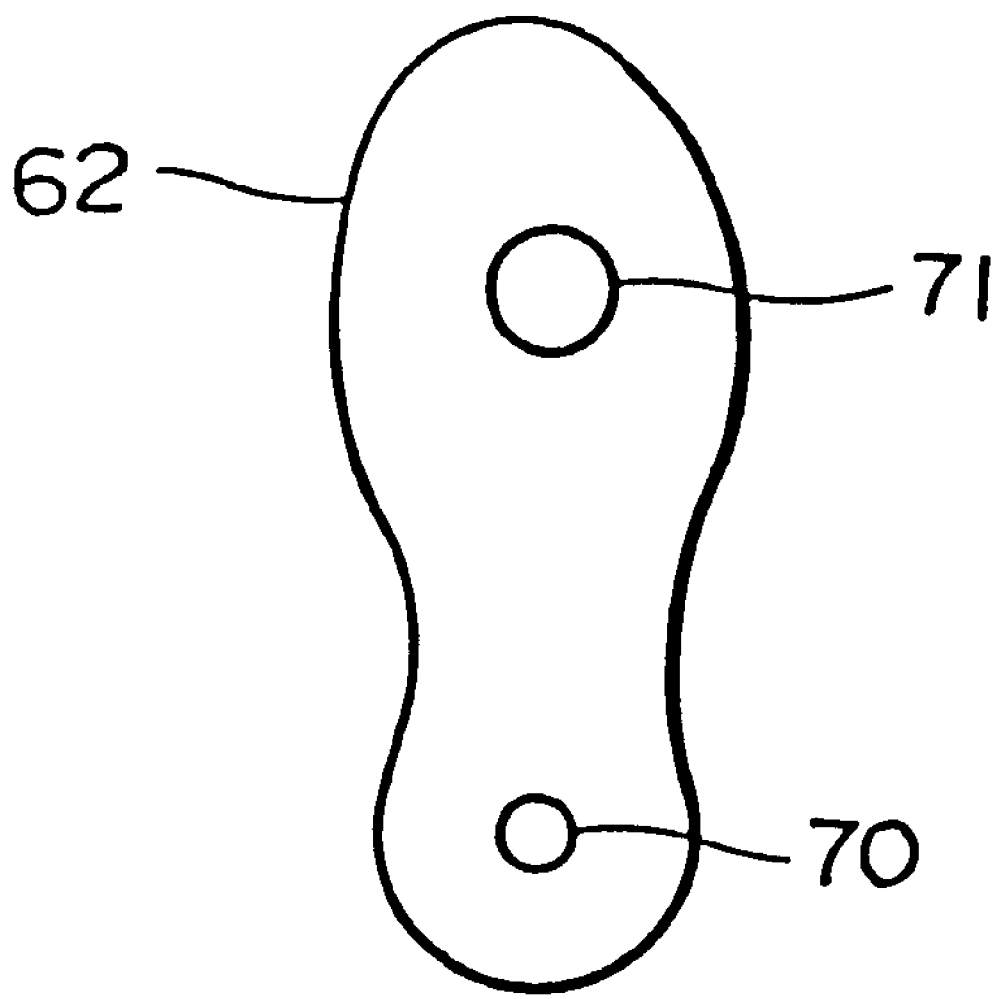
FIG. 18 is a plan view of the sole of another shoe which can be used in the robot manipulator shown in FIG. 13.

In the third embodiment, the ridges 64 of the illustrated shape on the shoes 62 are employed to detect a relative position/orientation of the feet on the foot support 63. However, as shown in FIG. 18, two projections 70, 71 spaced longitudinally of the shoe 62 may be disposed on the sole of each of the shoes 62. A relative position of the feet is recognized on the basis of a relative position of the projections 70, for example, and an orientation of each of the feet wearing the shoes 62 is recognized on the basis of the position of the projection 71 with respect to the projection 70, so that a relative orientation of the feet can be recognized. Furthermore, a relative positional or orientational relationship between the feet may be recognized according to a pattern recognition process based on patterns in which the feet are held in contact with the foot support 63.

In the third embodiment, the landing of the feet of the operator OP on the foot support 63 and the lifting of the feet of the operator OP off the foot support 63, and a relative position/orientation of the feet when the feet are landed on the foot support 63 are detected on the basis of output data from the distributed contact sensor 63a. However, they may be detected on the basis of output data from a distributed load sensor. Alternatively, the landing of the feet of the operator OP on the foot support 63 and the lifting of the feet of the operator OP off the foot support 63 may be detected by the landing sensors employed in the second embodiment.

In the third embodiment, the orientation of the upper body (torso 2) of the robot R with respect to the foot 7 of the supporting leg 3 may be determined depending on the orientation of the foot support 63 with respect to the foot of the operator OP which corresponds to the foot 7 of the supporting leg 3.

In each of the first, second, and third embodiments, the seat assembly 14 is employed as the upper body support mechanism. However, any of various other structures may be employed as the upper body support mechanism insofar as they can support the upper body of the operator OP.

In each of the first, second, and third embodiments, the robot R is arranged to stabilize its orientation by itself. However, the robot R may not be arranged to stabilize its orientation by itself.

Although certain preferred embodiments of the present invention have been shown and described in detail, it should be understood that various changes and modifications may be made therein without departing from the scope of the appended claims.

What is claimed is:

1. A remote control system for remotely controlling a biped locomotion robot as manipulated by an operator, comprising:

an upper body support mechanism for supporting an upper body of the operator while allowing the operator to move feet thereof;

foot operation state detecting means for detecting operation states of the feet of the operator whose upper body is supported by said upper body support mechanism; and leg operation commanding means for applying leg operation commands to the biped locomotion robot depending on the operation states of the feet of the operator as detected by said foot operation state detecting means.

2. A remote control system according to claim 1, wherein said operation states of the feet of the operator include at least an operation state of each of the feet of the operator which corresponds to lifting of each leg of the biped locomotion robot from a floor, and an operation state of each of the feet of the operator which corresponds to landing of each leg of the biped locomotion robot on a floor.

3. A remote control system according to claim 2, wherein said foot operation state detecting means comprises operator foot position/orientation detecting means for detecting a relative positional and/or orientational relationship between the feet of the operator in at least the operation state of each of the feet of the operator which corresponds to landing of each leg of the biped locomotion robot on the floor, and wherein said leg operation commanding means comprises means for applying a command representing a landed position and/or orientation of the leg to be landed of the biped locomotion robot to the biped locomotion robot depending on the relative positional and/or orientational relationship between the feet of the operator as detected by said foot operation state detecting means.

4. A remote control system according to any one of claims 1, 2, or 3, further comprising:

a foot support mechanism for supporting the feet of the operator whose upper body is supported by said upper body support mechanism, said foot support mechanism being movable with the feet of the operator;

actuator means for actuating said foot support mechanism;

robot foot position/orientation detecting means for detecting a position and/or orientation of a foot of a leg of the biped locomotion robot with respect to an upper body of the biped locomotion robot when said leg of the biped locomotion robot is landed on the floor; and foot support mechanism control means for controlling said actuator means to equalize the position and/or orientation of the foot of the operator which corresponds to the landed leg of the biped locomotion robot with respect to the upper body of the operator, to a position and/or orientation which corresponds to the position and/or orientation, detected by said robot foot position/orientation detecting means, of the foot of the landed leg of the biped locomotion robot with respect to the upper body of the biped locomotion robot.

5. A remote control system according to claim 4, wherein said foot support mechanism has foot acting force detecting means for detecting an acting force applied from each of the feet of the operator, and wherein said foot support mechanism control means comprises means for controlling said actuator means to cause said foot support mechanism to follow movement of each of the feet of the operator based on the acting force detected by said foot acting force detecting means.

6. A remote control system according to any one of claims 1, 2, or 3, further comprising:
   a foot support mechanism for supporting the feet of the operator whose upper body is supported by said upper body support mechanism, said foot support mechanism being movable with the feet of the operator;
   foot acting force detecting means for detecting an acting force applied from each of the feet of the operator;
   actuator means for actuating said foot support mechanism; and
   foot support mechanism control means for controlling said actuator means to cause said foot support mechanism to follow movement of each of the feet of the operator based on the acting force detected by said foot acting force detecting means.

7. A remote control system according to claim 5, wherein said foot support mechanism control means comprises means for controlling said actuator means to move said foot support mechanism into a position and/or orientation to reduce a change in the acting force detected by said foot acting force detecting means.

8. A remote control system according to claim 6, wherein said foot support mechanism control means comprises means for controlling said actuator means to move said foot support mechanism into a position and/or orientation to reduce a change in the acting force detected by said foot acting force detecting means.

9. A remote control system according to claim 1, further comprising:
   a rotatable ball for placing releasably thereon the feet of the operator whose upper body is supported by said upper body support mechanism;
   foot landing/lifting detecting means for detecting whether each of the feet of the operator is landed on or lifted off said ball; and
   ball rotation detecting means for detecting an angular displacement and/or a rotational direction of said ball when the ball is rotated by one of the feet of the operator after the other foot of the operator is lifted off the ball until said other foot is landed again on the ball;
   said foot operation state detecting means comprising means for producing detected data from said foot landing/lifting detecting means and detected data from said ball rotation detecting means as data indicative of said operation states of the feet of the operator.

10. A remote control system according to claim 9, wherein said leg operation commanding means comprises means for determining a leg of the biped locomotion robot which corresponds to the foot of the operator detected as being lifted off said ball by said foot landing/lifting detecting means, as a leg to be lifted off and landed on a floor, and applying a command indicative of a landed position and/or orientation for said leg depending on the angular displacement and/or the rotational direction of said ball as detected by said ball rotation detecting means, to said biped locomotion robot.

11. A remote control system according to claim 9 or 10, further comprising a shoe adapted to be worn by each of the feet of the operator, said foot landing/lifting detecting means being mounted on said shoe.

12. A remote control system according to claim 1, further comprising:
   a foot support for placing releasably thereon the feet of the operator whose upper body is supported by said upper body support mechanism, said feet of the operator being movable on said foot support;
   foot landing/lifting detecting means for detecting whether each of the feet of the operator is landed on or lifted off said foot support; and
   foot position/orientation detecting means for detecting a relative position/orientation of the feet of the operator on said foot support when one of the feet of the operator is lifted off said foot support and landed again on the foot support;
   said foot operation state detecting means comprising means for producing detected data from said foot landing/lifting detecting means and detected data from said foot position/orientation detecting means as data indicative of said operation states of the feet of the operator.

13. A remote control system according to claim 12, wherein said leg operation commanding means comprises means for determining a leg of the biped locomotion robot which corresponds to the foot of the operator detected as being lifted off said foot support by said foot landing/lifting detecting means, as a leg to be lifted off and landed on a floor, and applying a command indicative of a landed position and/or orientation for said leg depending on the relative position/orientation of the feet of the operator on said foot support as detected by said foot position/orientation detecting means, to said biped locomotion robot.

14. A remote control system according to claim 12 or 13, further comprising a distributed contact sensor mounted on an upper surface of said foot support, wherein said foot landing/lifting detecting means comprises means for detecting whether each of the feet of the operator is landed on or lifted off said foot support based on an output signal from said distributed contact sensor, and said foot position/orientation detecting means comprises means for detecting the relative position/orientation of the feet of the operator on said foot support based on an output signal from said distributed contact sensor.

15. A remote control system for remotely controlling a biped locomotion robot as manipulated by an operator, comprising:
   foot operation state detecting means to be engaged by the feet of the operator for detecting operating states of the feet of the operator, said foot operation state detection means being in a fixed location relative to movement of the biped locomotion robot; and
   leg operation commanding means for applying leg operation commands to the biped locomotion robot depending on the operation states of the feet of the operator as detected by said foot operation state detecting means.

16. A remote control system according to claim 15, wherein said operation states of the feet of the operator include at least an operation state of each of the feet of the operator which corresponds to lifting of each leg of the biped locomotion robot from a floor, and an operation state of each of the feet of the operator which corresponds to landing of each leg of the biped locomotion robot on a floor.

17. A remote control system according to claim 16, wherein said foot operation state detecting means comprises operator foot position/orientation detecting means for detecting a relative positional and/or orientational relationship between the feet of the operator in at least the operation state of each of the feet of the operator which corresponds to landing of each leg of the biped locomotion robot on the floor, and wherein said leg operation commanding means comprises means for applying a command representing a landed position and/or orientation of the leg to be landed of the biped locomotion robot to the biped locomotion robot depending on the relative positional and/or orientational relationship between the feet of the operator as detected by said foot operation state detecting means.

18. A remote control system according to any one of claims 15, 16 or 17, further comprising:
   a foot support mechanism for supporting the feet of the operator, said foot support mechanism being movable with the feet of the operator;
   actuator means for actuating said foot support mechanism;
   robot foot position/orientation detecting means for detecting a position and/or orientation of a foot of a leg of the biped locomotion robot with respect to an upper body of the biped locomotion robot when said leg of the biped locomotion robot is landed on the floor; and
   foot support mechanism control means for controlling said actuator means to equalize the position and/or orientation of the foot of the operator which corresponds to the landed leg of the biped locomotion robot with respect to the upper body of the operator, to a position and/or orientation which corresponds to the position and/or orientation, detected by said robot foot position/orientation detecting means, of the foot of the landed leg of the biped locomotion robot with respect to the upper body of the biped locomotion robot.

19. A remote control system according to claim 18, wherein said foot support mechanism has foot acting force detecting means for detecting an acting force applied from each of the feet of the operator, and wherein said foot support mechanism control means comprises means for controlling said actuator means to cause said foot support mechanism to follow movement of each of the feet of the operator based on the acting force detected by said foot acting force detecting means.

20. A remote control system according to any one of claims 15, 16 or 17, further comprising:
   a foot support mechanism for supporting the feet of the operator, said foot support mechanism being movable with the feet of the operator;
   foot acting force detecting means for detecting an acting force applied from each of the feet of the operator;
   actuator means for actuating said foot support mechanism; and
   foot support mechanism control means for controlling said actuator means to cause said foot support mechanism to follow movement of each of the feet of the operator based on the acting force detected by said foot acting force detecting means.

21. A remote control system according to claim 19, wherein said foot support mechanism control means comprises means for controlling said actuator means to move said foot support mechanism into a position and/or orientation to reduce a change in the acting force detected by said foot acting force detecting means.

22. A remote control system according to claim 20, wherein said foot support mechanism control means comprises means for controlling said actuator means to move said foot support mechanism into a position and/or orientation to reduce a change in the acting force detected by said foot acting force detecting means.

23. A remote control system according to claim 15, further comprising:
   a rotatable ball for placing releasably thereon the feet of the operator;
   foot landing/lifting detecting means for detecting whether each of the feet of the operator is landed on or lifted off said ball; and
   ball rotation detecting means for detecting an angular displacement and/or a rotational direction of said ball when the ball is rotated by one of the feet of the operator after the other foot of the operator is lifted off the ball until said other foot is landed again on the ball;
   said foot operation state detecting means comprising means for producing detected data from said foot landing/lifting detecting means and detected data from said ball rotation detecting means as data indicative of said operation states of the feet of the operator.

24. A remote control system according to claim 23, wherein said leg operation commanding means comprises means for determining a leg of the biped locomotion robot which corresponds to the foot of the operator detected as being lifted off said ball by said foot landing/lifting detecting means, as a leg to be lifted off and landed on a floor, and applying a command indicative of a landed position and/or orientation for said leg depending on the angular displacement and/or the rotational direction of said ball as detected by said ball rotation detecting means, to said biped locomotion robot.

25. A remote control system according to claim 23 or 24, further comprising a shoe adapted to be worn by each of the feet of the operator, said foot land/lifting detecting means being mounted on said shoe.

26. A remote control system according to claim 15, further comprising:
   a foot support for placing releasably thereon the feet of the operator said feet of the operator being movable on said foot support;
   foot landing/lifting detecting means for detecting whether each of the feet of the operator is landed on or lifted off said foot support; and
   foot position/orientation detecting means for detecting a relative position/orientation of the feet of the operator on said foot support when one of the feet of the operator is lifted off said foot support and landed again on the foot support;
   said foot operation state detecting means comprising means for producing detected data from said foot landing/lifting detecting means and detected data from said foot position/orientation detecting means as data indicative of said operation states of the feet of the operator.

27. A remote control system according to claim 26, wherein said leg operation commanding means comprises means for determining a leg of the biped locomotion robot which corresponds to the foot of the operator detected as being lifted off said foot support by said foot landing/lifting detecting means, as a leg to be lifted off and landed on a floor, and applying a command indicative of a landed position and/or orientation for said leg depending on the relative position/orientation of the feet of the operator on said foot support as detected by said foot position/orientation detecting means, to said biped locomotion robot.

28. A remote control system according to claim 26 or 27, further comprising a distributed contact sensor mounted on an upper surface of said foot support, wherein said foot landing/lifting detecting means comprises means for detecting whether each of the feet of the operator is landed on or lifted off said foot support based on an output signal from said distributed contact sensor, and said foot position/orientation detecting means comprises means for detecting the relative position/orientation of the feet of the operator on said foot support based on an output signal from said distributed contact sensor.

* * * * *